US012742077B2

(12) United States Patent
Tsunematsu et al.

(10) Patent No.: US 12,742,077 B2
(45) Date of Patent: Sep. 22, 2026

(54) SURFACE-TREATED INFRARED-ABSORBING FINE PARTICLES AND METHOD FOR PRODUCING THE SAME, INFRARED-ABSORBING FINE-PARTICLE DISPERSION LIQUID, AND INFRARED-ABSORBING FINE-PARTICLE DISPERSION BODY

(71) Applicant: SUMITOMO METAL MINING CO., LTD., Tokyo (JP)

(72) Inventors: Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 650 days.

(21) Appl. No.: 18/033,154

(22) PCT Filed: Oct. 20, 2021

(86) PCT No.: PCT/JP2021/038797
§ 371 (c)(1),
(2) Date: Apr. 21, 2023

(87) PCT Pub. No.: WO2022/085730
PCT Pub. Date: Apr. 28, 2022

(65) Prior Publication Data

US 2023/0392025 A1 Dec. 7, 2023

(30) Foreign Application Priority Data

Oct. 23, 2020 (JP) ................................ 2020-177937

(51) Int. Cl.

| | |
|---|---|
| ***C09D 5/32*** | (2006.01) |
| ***C08K 9/04*** | (2006.01) |
| ***C08K 9/06*** | (2006.01) |
| ***C09C 1/00*** | (2006.01) |
| ***C09C 3/08*** | (2006.01) |
| ***C09D 7/62*** | (2018.01) |
| *C08K 3/08* | (2006.01) |

(52) U.S. Cl.
CPC .................. *C09D 5/32* (2013.01); *C08K 9/06* (2013.01); *C09C 1/00* (2013.01); *C09C 3/08* (2013.01); *C09D 7/62* (2018.01); *C08K 2003/0887* (2013.01); *C08K 9/04* (2013.01)

(58) Field of Classification Search
CPC .... C08K 9/04; C08K 9/06; C08K 2003/0887; C09C 1/00
See application file for complete search history.

(56) References Cited

U.S. PATENT DOCUMENTS

| | | | |
|---|---|---|---|
| 2006/0178254 | A1 | 8/2006 | Takeda et al. |
| 2011/0297899 | A1 | 12/2011 | Tofuku |
| 2021/0047518 | A1 | 2/2021 | Tsunematsu et al. |

FOREIGN PATENT DOCUMENTS

| | | | |
|---|---|---|---|
| WO | 2005/037932 | A1 | 4/2005 |
| WO | 2010/055570 | A1 | 5/2010 |
| WO | 2019/093524 | A1 | 5/2019 |

OTHER PUBLICATIONS

Dec. 28, 2021 International Search Report issued in International Patent Application No. PCT/JP2021/038797.
Apr. 13, 2023 International Preliminary Report on Patentability issued in International Patent Application No. PCT/JP2021/038797.
Chen et al., "Core-shell structured CsxWO3@ZnO with excellent stability and high performance on near-infrared shielding," Ceramics International 44, pp. 2738-2744, 2018.

*Primary Examiner* — Vickey Nerangis
(74) *Attorney, Agent, or Firm* — Oliff PLC

(57) ABSTRACT

Surface-treated infrared-absorbing fine particles, including: infrared-absorbing fine particles; and a coating film containing a metal oxide hydrate provided so as to coat surfaces of the infrared-absorbing fine particles, wherein a carbon concentration is 5.0% by mass or less as measured by a combustion-infrared absorption method.

8 Claims, 1 Drawing Sheet

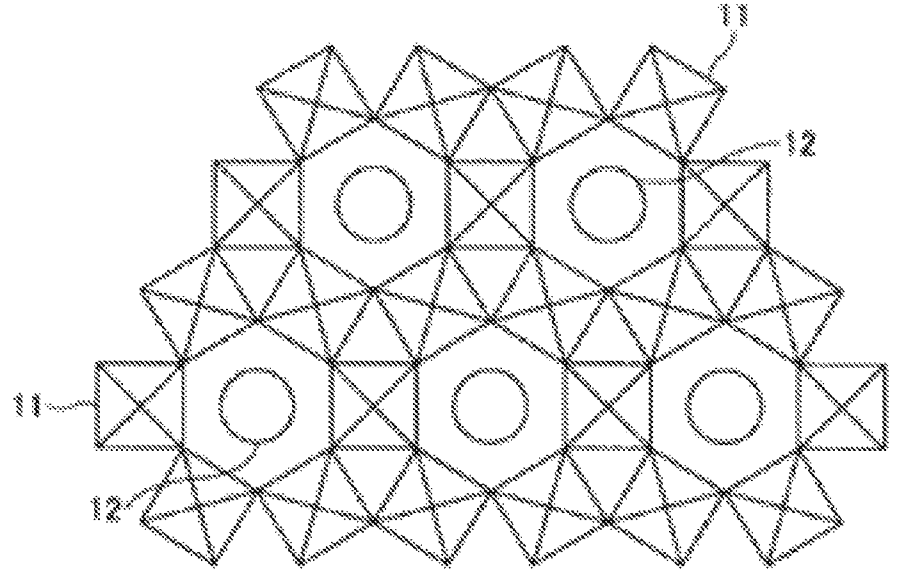
11
12
11
12

SURFACE-TREATED INFRARED-ABSORBING FINE PARTICLES AND METHOD FOR PRODUCING THE SAME, INFRARED-ABSORBING FINE-PARTICLE DISPERSION LIQUID, AND INFRARED-ABSORBING FINE-PARTICLE DISPERSION BODY

BACKGROUND

Technical Field

The present disclosure relates to surface-treated infrared-absorbing fine particles, a method for producing the same, an infrared-absorbing fine-particle dispersion liquid, and an infrared-absorbing fine-particle dispersion body.

Description of Related Art

In recent years, demand for infrared absorbers is rapidly increasing, and many patents relating to the infrared absorbers have been proposed. From a functional point of view, and in a field such as window materials for various buildings and vehicles, examples of the infrared absorbers include those aiming at shielding lights (infrared rays) in a near-infrared region while taking in enough visible lights, and suppressing a temperature rise in a room while maintaining a brightness.

As such an infrared absorber, the present inventors have disclosed in Patent Document 1 an infrared-absorbing fine particle dispersion body in which infrared-absorbing fine particles are dispersed in a medium. Specifically, an infrared-absorbing fine particle dispersion body containing tungsten oxide fine particles represented by a general formula WyOz (where W is tungsten, O is oxygen, and satisfying $2.2 \leq z/y \leq 2.999$) and/or composite tungsten oxide fine particles represented by a general formula MxWyOz (where M is one or more elements selected from H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and satisfying $0.001 \leq x/y \leq 1$, $2.2 \leq z/y \leq 3.0$) and having a particle diameter of 1 nm or more and 800 nm or less), as such an infrared absorber.

In the infrared-absorbing fine particles of Patent Document 1, a surface is decomposed by contact with moisture, and a transmittance of infrared rays increases over time, and infrared absorption properties inherent in the infrared-absorbing fine particles cannot be maintained in some cases.

Therefore, the present inventors disclose in Patent Document 2 a technique for coating surfaces of infrared-absorbing fine particles with a tetrafunctional silane compound or its partial hydrolysis product and/or an organometallic compound, to improve a water resistance of the infrared-absorbing fine particles.

Further, since the infrared absorber is used outdoors, the infrared-absorbing fine particles are required to be excellent in a long-term exposure resistance (moist-heat resistance) in a moist-heat atmosphere as well as water resistance. The moist-heat resistance means that even when the infrared absorber is exposed to a moist-heat atmosphere for a long period of time, an amount of change in an infrared transmittance before and after the exposure is small and infrared-absorbing properties can be maintained at a high level.

In this regard, the inventors of the present invention have disclosed in Patent Document 3 a technique for improving the moist-heat resistance of the infrared-absorbing fine particles of Patent Document 2. Specifically, Patent Document 3 discloses a technique for coating the surfaces of infrared-absorbing fine particles with a metal chelate compound, a hydrolysis product of a metal cyclic oligomer compound, or a polymer thereof.

PRIOR ART DOCUMENTS

Patent Document

[Patent Document 1] International Publication No. 2005/37932

[Patent Document 2] International Publication No. 2010/55570

[Patent Document 3] International Publication No. 2019/093524

SUMMARY OF THE DISCLOSURE

Problem to be Solved by the Disclosure

However, infrared-absorbing fine particles are required to have higher moist-heat resistance, and further improvement is required. Specifically, there is a demand for maintaining high infrared-absorbing properties for a longer period of time when the infrared-absorbing fine particle dispersion body is exposed to the moist-heat atmosphere.

An object of the present invention is to provide a technique for improving a moist-heat resistance while maintaining excellent infrared absorption properties in infrared-absorbing fine particles.

Means for Solving the Problem

A first aspect of the present invention provides surface-treated infrared-absorbing fine particles, including:

infrared-absorbing fine particles; and a coating film containing a metal oxide hydrate provided so as to coat surfaces of the infrared-absorbing fine particles, wherein a carbon concentration is 5.0% by mass or less as measured by a combustion-infrared absorption method.

A second aspect of the present invention provides the surface-treated infrared-absorbing fine particles according to the first aspect, wherein the metal oxide contains one or more metal elements selected from Al, Zr, Ti, Si, and Zn.

A third aspect of the present invention provides the surface-treated infrared-absorbing fine particles according to the first or second aspect, wherein the infrared-absorbing fine particles are at least one of tungsten oxide fine particles represented by a general formula WyOz (where W is tungsten, O is oxygen, and satisfying $2.2 \leq z/y \leq 2.999$) or composite tungsten oxide fine particles represented by a general formula MxWyOz (where M is one or more elements selected from H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, and satisfying $0.001 \leq x/y \leq 1$, $2.0 \leq z/y \leq 3.0$).

A fourth aspect of the present invention provides an infrared-absorbing fine particle dispersion liquid, containing the surface-treated infrared-absorbing fine particles according to any one of the first to third aspects and a liquid medium.

A fifth aspect of the present invention provides the infrared-absorbing fine particle dispersion liquid according to the fourth aspect, wherein the liquid medium is at least one of an organic solvent, a fat and oil, a liquid plasticizer, a compound polymerized by curing, and water.

A sixth aspect of the present invention provides an infrared-absorbing fine particle dispersion body, comprising the surface-treated infrared-absorbing fine particles of any one of the first to third aspects dispersed in a solid resin.

A seventh aspect of the present invention provides the infrared-absorbing fine particle dispersion body according to the sixth aspect, wherein the solid resin is at least one of fluorine resin, PET resin, acrylic resin, polyamide resin, vinyl chloride resin, polycarbonate resin, olefin resin, epoxy resin and polyimide resin.

An eighth invention provides a method for producing surface-treated infrared-absorbing fine particles, the method including:

- mixing infrared-absorbing fine particles and water to obtain a coating film-forming dispersion liquid;
- adding a surface treatment agent containing a metal chelate compound to the coating film-forming dispersion liquid; and
- applying heat treatment to the coating film-forming dispersion liquid to which the surface treatment agent has been added,
- to obtain surface-treated infrared-absorbing fine particles in which a coating film containing a metal oxide hydrate derived from the metal chelate compound, is formed on surfaces of the infrared-absorbing fine particles.

A ninth aspect of the present invention provides the method for producing surface-treated infrared-absorbing fine particles according to the eighth aspect, wherein the heat treatment is performed at a temperature of 40° C. or higher and 80° C. or lower for 4 hours or longer.

Advantage of the Invention

According to the present invention, moist-heat resistance can be improved while maintaining excellent infrared absorption properties in infrared-absorbing fine particles.

BRIEF DESCRIPTION OF THE DRAWINGS

FIG. 1 is a schematic plan view of a crystal structure in a composite tungsten oxide having a hexagonal crystal structure.

DETAILED DESCRIPTION OF THE INVENTION

<Finding by the Present Inventors>

In order to solve the above-described problem, a coating film that coats surfaces of infrared-absorbing fine particles was investigated, and attention was paid to a metal chelate compound as a compound that forms the coating film. The metal chelate compound is hydrolyzed to form a hydrolysis product or a polymer thereof, which deposits on the surfaces of the infrared-absorbing fine particles to form a coating film.

Compounds that form the coating film include, for example, a metal cyclic oligomer compound other than the metal chelate compound. However, the metal cyclic oligomer compound must be dissolved in a low polar solvent such as xylene and toluene, and therefore when water, which is a highly polar solvent, is added for hydrolysis, a hydrolysis reaction may not proceed sufficiently due to a presence of the low polar solvent. Therefore, a carbon component derived from the metal cyclic oligomer compound may remain in the coating film. In contrast, the metal chelate compound does not require the use of the low polar solvent unlike the metal cyclic oligomer compound, and the hydrolysis reaction proceeds easily with addition of water, and therefore a residual carbon component relative to the metal cyclic oligomer compound, can be suppressed. Therefore, according to the metal chelate compound, an affinity between the coating film and the infrared-absorbing fine particles is higher than that of the metal cyclic oligomer compound, and the coating film can be provided more uniformly on the surfaces of the infrared-absorbing fine particles. Therefore, a stronger coating film can be formed. As a result, with use of the metal chelate compound, higher moist-heat resistance can be obtained.

However, it has been confirmed that when the coating film formed from the metal chelate compound is exposed to a moist-heat atmosphere for a long period of time, the transmittance of infrared rays increases over time, and desired infrared absorption properties cannot be maintained for a long period of time. Particularly, it has been confirmed that the transmittance of light with wavelengths of 800 nm to 1000 nm among infrared rays increased significantly. That is, it has been confirmed that the coating film formed from the metal chelate compound has room for improvement in terms of the moist-heat resistance.

According to studies by the present inventors, it is found that a carbon component derived from a hydrolysis product or a polymer thereof remain in the coating film formed from the metal chelate compound, and the higher the concentration of these, the lower the moist-heat resistance is likely to be. Although this mechanism is not clear, it is presumed that the carbon component prevents the formation of a dense or high-density coating film, and as a result, lowers the moist-heat resistance.

For this reason, the present inventors investigated a method for reducing the carbon component in the coating film. Then, attention was paid to a method of applying heat treatment to this coating film after forming the coating film formed from the hydrolysis product or the polymer thereof.

According to the heat treatment, the hydrolysis product or the polymer contained in the coating film can be further hydrolyzed into metal oxide hydrate, and the coating film can be configured to include the metal oxide hydrate. That is, in the coating film, the content of the hydrolysis product or polymer can be reduced, and the carbon component derived therefrom can be reduced. Then, after further studies, it is found that by configuring the coating film so that the carbon component has a predetermined concentration, the moist-heat resistance can be improved while maintaining the infrared absorption properties inherent in the surface-treated infrared-absorbing fine particles.

The present invention has been made based on the finding described above.

<One Embodiment>

One embodiment of the present invention will be described below.

<1> Surface-Treated Infrared-Absorbing Fine Particles

The surface-treated infrared-absorbing fine particles of the present embodiment comprises infrared-absorbing fine particles and a coating film.

<1-1> Infrared-Absorbing Fine Particles

The infrared-absorbing fine particles are particles that contain various materials containing free electrons and exhibit a reflection-absorption response (have infrared absorption properties) to electromagnetic waves having a wavelength range in the vicinity of the solar lights having the wavelengths of 200 nm to 2600 nm, due to plasma oscillation. The infrared-absorbing fine particles can reduce geometric scattering in a visible light region (wavelength from 380 nm to 780 nm), for example, by having a particle size smaller than the wavelength of light, and particularly high transparency can be obtained in the visible light region. The term "transparency" as used herein means "having little scattering and high transparency for the light in the visible light region".

Known fine particles can be used as the infrared-absorbing fine particles, but from a viewpoint of obtaining high infrared-absorbing properties while ensuring transparency, it is preferable to use at least one of tungsten oxide fine particles and composite tungsten oxide fine particles. Since these infrared-absorbing fine particles largely absorb light in the near-infrared region, particularly light with a wavelength of about 1000 nm, many of them have a transmitted color tone of bluish to greenish. The fine particles will be respectively described hereafter.

(Tungsten Oxide Fine Particles)

The tungsten oxide fine particles comprise $WO_3$ having oxygen deficiency and are represented by a general formula WyOz (where W is tungsten and O is oxygen).

Regarding a composition range of tungsten and oxygen in the tungsten oxide represented by the general formula WyOz, it is preferable that a composition ratio of oxygen to tungsten is less than 3, and further, $2.2 \leq z/y \leq 2.999$ when the infrared-absorbing fine particles are represented by WyOz. When the value of z/y is 2.2 or more, it is possible to avoid an appearance of an unintended $WO_2$ crystal phase in the tungsten oxide, and to obtain chemical stability as a material, and therefore effective infrared-absorbing fine particles can be obtained. On the other hand, when the value of z/y is 2.999 or less, a necessary amount of free electrons is generated, and efficient infrared-absorbing fine particles can be obtained.

(Composite Tungsten Oxide Fine Particles)

Composite tungsten oxide fine particles comprise tungsten oxide ($WO_3$) with addition of a positive element that generates free electrons (hereinafter also referred to as M element), and are fine particles of composite tungsten oxide represented by a general formula MxWyOz (where M is a positive element, W is tungsten, and O is oxygen). The composite tungsten oxide fine particles exhibits infrared absorption properties by controlling an amount of oxygen and adding the element M, and exhibits strong absorption properties especially around 1000 nm.

Further, in the composite tungsten oxide fine particles, element M is not particularly limited as long as it can generate free electrons, but it is preferable that element M is one or more elements selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and 1.

Further, it is more preferable that element M is one or more elements selected from alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, T1, Si, Ge, Sn, Pb, Sb, B, F, P, S, Se, Br, Te, Ti, Nb, V, Mo, Ta, and Re, from a viewpoint of stability in MxWyOz. Further, it is more preferable that element M belongs to alkaline earth metal elements, transition metal elements, group 4B elements, and group 5B elements, from a viewpoint of improving optical properties and weather resistance as infrared-absorbing fine particles.

Further, in the composite tungsten oxide represented by the general formula MxWyOz, each composition range of the element M, tungsten and oxygen is not particularly limited, but it is preferable to satisfy a relationship of $0.001 \leq x/y \leq 1$ and $2.0 \leq z/y \leq 3$.

Regarding the above composition, first, a value of x/y indicating an added amount of the element M will be described.

When the value of x/y is 0.001 or more, a sufficient amount of free electrons are generated in the composite tungsten oxide, and a desired infrared absorption effect can be obtained. Then, as the added amount of the element M increases, a supply amount of free electrons increases and an infrared absorption efficiency also increases, but the effect saturates when the value of x/y is about 1. Further, when the value of x/y is 1 or less, it is possible to avoid a formation of an impurity phase in the composite tungsten oxide fine particles, which is preferable.

Next, the value of z/y indicating the control of an oxygen amount will be described.

Regarding the value of z/y, even in the composite tungsten oxide represented by MxWyOz, the same mechanism as that of the tungsten oxide represented by WyOz described above works, and in addition, even in the case of $z/y=3.0$ or $2.0 \leq z/y \leq 2.2$, free electrons are supplied depending on the added amount of the element M. Therefore, $2.0 \leq z/y \leq 3.0$ is preferable, $2.2 \leq z/y \leq 3.0$ is more preferable, and $2.45 \leq z/y \leq 3.0$ is even more preferable.

Further, the composite tungsten oxide fine particles preferably have a hexagonal crystal structure from a viewpoint of improving the transparency in the visible light region and the infrared absorption properties. This point will be described with reference to FIG. 1. FIG. 1 is a schematic plan view of the crystal structure in the composite tungsten oxide having a hexagonal crystal structure.

In FIG. 1, six octahedrons formed by $WO_6$ units indicated by reference numeral 11 are aggregated to form hexagonal voids, and element M indicated by reference numeral 12 is arranged in the voids to form one unit, and a large number of these one units are assembled to form a hexagonal crystal structure. In order to obtain an effect of improving light transmission in the visible light region and improving light absorption in the infrared region, the unit structure described with reference to FIG. 1 may be contained in the composite tungsten oxide fine particles, and the composite tungsten oxide fine particles may be either one of crystalline or amorphous.

When positive ions of the element M are added to the hexagonal voids, the transmission of light in the visible light region is improved, and the absorption of light in the infrared region is improved. Here, in general, when the element M having a large ionic radius is added, the hexagonal crystal is likely to be formed. Specifically, addition of Cs, K, Rb, Tl, In, Ba, Li, Ca, Sr, Fe, and Sn tends to form a hexagonal crystal. Elements other than these may be acceptable and the elements are not limited to the above elements as long as the above element M is present in the hexagonal voids formed by the $WO_6$ units.

When the composite tungsten oxide fine particles having a hexagonal crystal structure have a uniform crystal structure, an added amount of the element M is preferably 0.2 or more and 0.5 or less, more preferably 0.33 in terms of x/y. It is considered that the above-described element M is arranged in all the hexagonal voids because the value of x/y is 0.33.

The crystal structure of the composite tungsten oxide is not limited to hexagonal, and may be tetragonal or cubic.

Depending on a crystal structure, an absorption position in the infrared region tends to change, and the absorption position tends to move to a longer wavelength side in an order of cubic<tetragonal<hexagonal. Accordingly, the absorption in the visible light region is low in an order of hexagonal, tetragonal, and cubic, and it is preferable to use a hexagonal composite tungsten oxide for the purpose of transmitting more light in the visible region and absorbing more light in the infrared region. However, the tendency of the optical properties described here is only a rough tendency, and varies depending on the type of the added element, the added amount, and an amount of oxygen, and the present invention is not limited there to the hexagonal composite tungsten oxide.

In the composite tungsten oxide fine particles and the tungsten oxide fine particles described above, a so-called "Magneli phase" having a composition ratio expressed by $2.45 \leq z/y \leq 2.999$ is chemically stable and has good absorption properties in the infrared region, and is therefore preferable as an infrared-absorbing fine particle.

(Crystallite Size)

Although a crystallite size of the infrared-absorbing fine particles is not particularly limited, it is preferably 1 nm or more and 200 nm or less, more preferably 1 nm or more and 100 nm or less, and still more preferably 10 nm or more and 70 nm or less, from a viewpoint of obtaining higher infrared absorption properties. Here, the crystallite size is measured by an X-ray diffraction pattern measurement by powder X-ray diffraction method (θ-2θ method) and using analysis by Rietveld method. The X-ray diffraction pattern can be measured using, for example, a powder X-ray diffractometer "X'Pert-PRO/MPD" manufactured by PANalytical, Spectris Co., Ltd., or the like.

<1-2> Coating Film

The coating film is formed so as to coat the surfaces of the infrared-absorbing fine particles, and improves the moist-heat resistance of the infrared-absorbing fine particles. As described above, the coating film is formed by applying a heat treatment to the hydrolysis product obtained by hydrolyzing the metal chelate compound or the polymer thereof, and comprises a metal oxide hydrate derived from the metal chelate compound. Further, the coating film may contain a metal oxide from which water has been desorbed, in addition to the metal oxide hydrate. Hereinafter, regarding the film formed on the surfaces of the infrared-absorbing fine particles, the film before heat treatment is referred to as a deposited film, and the deposited film subjected to heat treatment is referred to as a coating film.

The metal chelate compound has a metal and a hydrolyzed structure. The metal chelate compound becomes a hydrolysis product in which part or all of the hydrolysis structure is converted to hydroxyl groups or carboxyl groups by a hydrolysis reaction, or becomes a self-condensed polymer by the hydrolysis reaction. Due to the deposition of the hydrolysis product or polymer on the surfaces of the infrared-absorbing fine particles, the deposited film containing the hydrolysis product or polymer is formed. In the present embodiment, the heat treatment is applied to the infrared-absorbing fine particles coated with the deposited film. Heating accelerates the hydrolysis reaction of the hydrolysis product or polymer contained in the deposited film to produce a metal oxide hydrate derived from the metal chelate compound. Thereby, the coating film containing the metal oxide hydrate can be obtained.

The metal oxide hydrate contained in the coating film contains a metal element derived from the metal chelate compound. The metal element contained in the metal oxide hydrate is not particularly limited, but preferably includes any one of aluminum (Al), zirconium (Zr), titanium (Ti), silicon (Si) and zinc (Zn), from a viewpoint of the moist-heat resistance. It is preferable that the metal oxide hydrate specifically includes one or more of alumina hydrate, zirconia hydrate, titania hydrate, silica hydrate, and zinc oxide hydrate.

Not only the metal oxide hydrate but also the hydrolysis product or polymer are remained in some cases in the coating film. The hydrolysis product or polymer contain carbon components, but in the present embodiment, the amount of hydrolysis product or polymer can be reduced, so the carbon concentration in the coating film can be reduced. Specifically, the carbon concentration in the coating film can be 5.0% by mass or less. It is preferably 3.5% by mass or less, more preferably 3.0% by mass or less, and even more preferably 2.5% by mass or less. By setting the carbon concentration within the above range, the coating film can be formed more densely, and a desired moist-heat resistance can be obtained. Although a lower limit is not particularly limited, it is 0.01% by mass. Further, the carbon concentration contained in the coating film is measured using a carbon analyzer or the like based on a combustion-infrared absorption method. For example, a carbon analyzer "CS-600" manufactured by LECO can be used.

Further, since the coating film mainly contains a hydrate of a metal oxide, the content of water derived from hydrate is preferably 0.50% by mass or more and 10% by mass or less. More preferably, it is 1.0% by mass or more and 8.0% by mass or less.

Here, the content of water derived from hydrate will be described.

The water contained in the coating film originates not only from the hydrate but also from the hydrolysis product or polymer that remain unhydrolyzed. Since the hydroxyl group, etc., remains in the hydrolysis product, the hydroxyl group, etc., may be detected as water in analysis by a thermal analyzer. Therefore, the content h of the water derived from hydrate is calculated by subtracting the content of the water derived from hydrolysis product having the hydroxyl group, etc., from the content of the water contained in the coating film.

The content of the water derived from hydrolysis product is calculated as $c/(x \times 12) \times y \times 18$, from the carbon concentration c [mass %] contained in the coating film, the number x of carbon atoms contained in the hydrolysis product, and the number y of water molecules generated when the hydrolysis product is thermally analyzed. x and y are appropriately changed according to the type of the metal chelate compound to be used, that is, according to the type of the hydrolysis product to be produced. On the other hand, the content of the water contained in the coating film is measured by thermally analyzing the surface-treated infrared-absorbing fine particles. Then, the content h of the water derived from hydrate can be calculated by subtracting the content of the water derived from hydrolysis product, from the content of the water contained in the coating film. Specific calculations will be described in detail in examples described later.

Although the thickness of the coating film is not particularly limited, it is preferably 0.5 nm or more and 100 nm or less, more preferably 0.5 nm or more and 20 nm or less, and even more preferably 1 nm or more and 10 nm or less. By setting the thickness to 0.5 nm or more, a desired moist-heat resistance can be obtained in the surface-treated infrared-absorbing fine particles. On the other hand, by setting the thickness to 100 nm or less, optical properties such as transparency and infrared absorption properties can be ensured in the surface-treated infrared-absorbing fine particles.

The thickness of the coating film can be calculated from the content of the coating film estimated from the added amount of the metal chelate compound, the specific gravity of the coating film, and the BET specific surface area of the infrared-absorbing fine particles. For example, the thickness t [nm] of the coating film is calculated as $t=(x\times10)/(S\times d)$, where the content of the coating film per 100 parts by mass of the infrared-absorbing fine particles calculated from the added amount of the metal chelate compound is x parts by mass, the specific gravity of the coating film is d [$g/cm^3$], and the BET specific surface area of the infrared-absorbing fine particles is S [$m^2/g$]. Here, the specific gravity d of the coating film is measured by adding only the metal chelate compound to water and performing the same operations as the surface treatment and heat treatment described later to obtain a hydrate powder comprising a metal oxide hydrate, and using this powder. The specific gravity of the metal oxide hydrate is as follows: for example, alumina hydrate is 2.5 $g/cm^3$, zirconia hydrate is 3.5 $g/cm^3$, titania hydrate is 2.6 $g/cm^3$, silica hydrate is 2.0 $g/cm^3$, and zinc oxide hydrate is 3.5 $g/cm^3$.

The metal chelate compound for forming the coating film has a metal and hydrolysis structure, and forms a hydrolysis product that can deposit on the surfaces of the infrared-absorbing fine particles due to hydrolysis. The metal contained in the metal chelate compound preferably contains any one of Al, Zr, Ti, Si and Zn from a viewpoint of improving the moist-heat resistance of the surface-treated infrared-absorbing fine particles. Further, the hydrolysis structure preferably has one or more selected from an ether bond, an ester bond, an alkoxy group, and an acetyl group. Specifically, metal alkoxide, metal acetylacetonate and metal carboxylate are preferable.

As the metal chelate compound, specifically, the following compounds can be used.

Examples of aluminum chelate include aluminum alcoholates such as aluminum ethylate, aluminum isopropylate, aluminum sec-butylate, and mono-sec-butoxyaluminum diisopropylate, or polymers thereof, ethylacetoacetate aluminum diisopropylate, aluminum tris(ethylacetoacetate), octylacetoacetate aluminum diisoproplate, stearylacetoaluminum diisopropylate, aluminum monoacetylacetonate bis (ethylacetoacetate), and aluminum tris(acetylacetonate).

These compounds are alkoxy-containing aluminum chelates obtained by dissolving aluminum alcoholate in an aprotic solvent, a petroleum solvent, a hydrocarbon solvent, an ester solvent, a ketone solvent, an ether solvent, an amide solvent, or the like, adding β-diketone, β-ketoester, mono- or polyhydric alcohol, fatty acid, or the like to the resulting solution, followed by heating to reflux and ligand displacement reaction.

Examples of zirconia chelate include zirconium alcoholates such as zirconium ethylate, and zirconium butylate, or polymers thereof, zirconium tributoxystearate, zirconium tetraacetylacetonate, zirconium tributoxyacetylacetonate, zirconium dibutoxybis (acetylacetonate), zirconium tributoxyethylacetoacetate, zirconium butoxyacetylacetonate bis (ethylacetoacetate.

Examples of titanium chelate include titanium alcoholates such as methyl titanate, ethyl titanate, isopropyl titanate, butyl titanate, and 2-ethylhexyl titanate, or polymers thereof, titanium acetylacetonate, titanium tetraacetylacetonate, titanium octylene glycolate, titanium ethylacetoacetate, titanium lactate, and titanium triethanolaminate.

As a silicon chelate compound, a tetrafunctional silane compound represented by the general formula Si(OR). (where R is the same or different monovalent hydrocarbon group having 1 to 6 carbon atoms) or a hydrolysate thereof can be used. Specific examples of the tetrafunctional silane compound include tetramethoxysilane, tetraethoxysilane, tetrapropoxysilane, and tetrabutoxysilane. Further, silane monomers in which some or all of the alkoxy groups of the alkoxysilane monomers are hydrolyzed to silanol (Si—OH) groups, and polymers obtained by self-condensation through hydrolysis can be used.

Further, examples of the hydrolysate of the tetrafunctional silane compound (appropriate terms are unknown, which represent an entire intermediate of the tetrafunctional silane compound) include silane monomers in which some or all of the alkoxy groups are hydrolyzed to silanol (Si—OH) group. Note that not necessarily all of the alkoxysilyl (Si—OR) groups in the alkoxysilane monomer are hydrolyzed to silanol (Si—OH) groups in the course of hydrolysis.

Examples of a zinc chelate compound preferably include organic carboxylic acid zinc salts such as zinc octylate, zinc laurate, zinc stearate, acetylacetone zinc chelate, benzoylacetone zinc chelate, dibenzoylmethane zinc chelate, and ethyl acetoacetate zinc chelate.

Among the above metal chelate compounds, those containing Al are particularly preferable. According to the Al-based metal chelate compound, the hydrolysis reaction is not as fast as the Ti-based or Zn-based, and the hydrolysis reaction is faster than the Zr-based. Therefore, it is easy to control the hydrolysis reaction, and it is easy to form the coating film uniformly on the surfaces of the infrared-absorbing fine particles. As a result, the moist-heat resistance of the coating film can be improved and the coating film can be stably formed. In addition, a production cost can be reduced, and a safety is also excellent.

<2> Method for Producing Surface-Treated Infrared-Absorbing Fine Particles

Next, a method for producing the above-described surface-treated infrared-absorbing fine particles will be described.

<2-1> Preparation of a Coating Film-Forming Infrared-Absorbing Fine Particle Dispersion Liquid First, fine particle powder containing infrared-absorbing fine particles is added to and dispersed in a liquid medium to prepare an infrared-absorbing fine particle dispersion liquid for forming a coating film (hereinafter also referred to as a coating film-forming dispersion liquid). Here, the fine particle powder may be finely pulverized in advance and then added to the liquid medium. Alternatively, after adding the fine particle powder to the liquid medium, pulverization and dispersion treatment may be performed. Thereby, aggregation of the infrared-absorbing fine particles can be suppressed, and the infrared-absorbing fine particles can be monodispersed in the liquid medium. As a result, at the time of forming the coating film, the coating film can be uniformly formed on individual infrared-absorbing fine particles.

Water is used as the liquid medium for the coating film-forming dispersion liquid. This is because by using water, the hydrolysis reaction of the metal chelate compound can be immediately started when the metal chelate compound is added to the coating film-forming dispersion liquid. Specifically, the hydrolysis structure of the metal chelate compound includes a substituent that is easily hydrolyzed even with a small amount of water and a substituent that is hydrolyzed with a large amount of water. For example, in the case of aluminum ethyl acetoacetate diisopropylate, which is a metal chelate compound, the isopropoxy group can be hydrolyzed even with a small amount of water to form aluminum ethyl acetoacetate dihydroxide, and meanwhile a substituent containing ethyl acetoacetate tend to hydrolyze only with a large amount of water. When such a metal chelate compound is added as a liquid medium to an organic solvent and then hydrolyzed, only part of but not all of the hydrolyzable structure in the metal chelate compound is hydrolyzed in some cases. As a result, in the coating film, a carbon component derived from the substituent that cannot be fully hydrolyzed remain, and a carbon concentration in the coating film tends to increase. In contrast, by using water as the liquid medium, the hydrolysis structure can be hydrolyzed more reliably, the carbon component remaining in the coating film can be reduced, and the carbon concentration can be further lowered. As a result, the coating film can be made highly dense.

In the coating film-forming dispersion liquid, the added amount of the infrared-absorbing fine particles is not particularly limited, but it is preferable to adjust a dispersion concentration of the infrared-absorbing fine particles dispersed in the liquid medium to 0.01% by mass or more and 80% by mass or less. By setting such a dispersion concentration, the pH of the coating film-forming dispersion liquid can be 8 or less, and it is possible to easily maintain a state in which the infrared-absorbing fine particles are dispersed in the liquid medium by electrostatic repulsion.

Further, specific methods for pulverizing and dispersing fine particle powder include, for example, a pulverizing and dispersing method using devices such as a bead mill, ball mill, sand mill, paint shaker, and ultrasonic homogenizer. Among them, it is preferable to perform pulverization and dispersion treatment with a medium stirring mill such as a bead mill, a ball mill, a sand mill, and a paint shaker with use of medium media such as beads, balls, and Ottawa sand, because the time to reach a desired dispersed particle size is short.

<2-2> Preparation of Surface Treatment Agent

Next, a surface treatment agent containing a metal chelate compound is prepared.

As the surface treatment agent, the metal chelate compound may be used as it is, but when adding to the coating film-forming dispersion liquid, the metal chelate compound may be diluted with a solvent in order to adjust the added amount per hour. As the solvent used for dilution, a solvent that does not react with the metal chelate compound and has high compatibility with the liquid medium contained in the coating film-forming dispersion liquid is preferable. Specifically, alcohol-based, ketone-based, glycol-based, etc., can be preferably used. Although a dilution ratio is not particularly limited, the dilution ratio is preferably 100 times or less from a viewpoint of ensuring productivity.

<2-3> Addition of Surface Treatment Agent

Next, a predetermined amount of a surface treatment agent containing a metal chelate compound is added to the coating film-forming dispersion liquid over a predetermined period of time. The metal chelate compound is added to the coating film-forming dispersion liquid and hydrolyzed to form a hydrolysis product or polymer thereof. By depositing the hydrolysis product or polymer on the surfaces of the infrared-absorbing fine particles, a deposited film containing at least one of the hydrolysis product or polymer is formed.

The addition of the surface treatment agent may be performed while stirring and mixing the coating film-forming dispersion liquid. Aggregation of the infrared-absorbing fine particles can be suppressed by stirring and mixing, and a monodispersed state can be maintained. Thereby, it is possible to suppress the formation of a coating film on the surface of the aggregate of the infrared-absorbing fine particles, and to allow the hydrolysis product or polymer to deposit uniformly and firmly on the surfaces of individual fine particles. As a result, it is possible to form a highly-dense coating film, while suppressing the formation of coarse particles that reduce transparency.

The added amount of the metal chelate compound is preferably 0.1 parts by mass or more and 1000 parts by mass or less in terms of the metal element, and more preferably 1 part by mass or more and 500 parts by mass or less, and further preferably 10 parts by mass or more and 150 parts by mass or less, based on 100 parts by mass of the infrared-absorbing fine particles. By setting the added amount to 0.1 part by mass or more, a desired moist-heat resistance can be obtained from the coating film. On the other hand, by setting the added amount to 1000 parts by mass or less, it is possible to avoid an excessive coating amount of the metal oxide hydrate relative to the infrared-absorbing fine particles. Further, an improvement in moist-heat resistance due to surface treatment does not saturate, and an improvement in a coating effect can be expected. Further, it is possible to avoid granulation of the fine particles each other through the metal oxide hydrate during removal of the medium, due to an excessive coating amount of the metal oxide hydrate relative to the infrared-absorbing fine particles. As a result, a decrease in transparency due to granulation can be suppressed, and good transparency can be ensured. In addition, it is also possible to avoid an increase in a production cost due to an increase in the added amount of metal chelate compound and an increase in treatment time.

Immediately after the addition of the metal chelate compound to the coating film-forming dispersion liquid, the metal chelate compound is decomposed into metal ions in some cases. However, when the addition time elapses and the added amount increases to reach a saturated aqueous solution, the decomposition to metal ions ends.

<2-4> Heat Treatment

Next, a heat treatment is applied to the dispersion liquid containing infrared-absorbing fine particles with the deposited film formed on the surfaces.

The heat treatment further hydrolyzes the hydrolysis product or polymer contained in the deposited film to form a metal oxide hydrate. Heat treatment increases the ratio of metal oxide hydrate in the coating film and reduces the carbon component derived from the hydrolysis product, etc. At this time, the heat treatment is performed so that the carbon concentration contained in the coating film is 5.0% by mass or less. Thereby, the surface-treated infrared-absorbing fine particles are formed, with a coating film containing a metal oxide hydrate formed on the surfaces.

In the heat treatment, the heating temperature and the heating time are preferably adjusted as appropriate. The heating temperature is preferably 40° C. or higher and 80° C. or lower, more preferably 50° C. or higher and 70° C. or lower, and even more preferably 50° C. or higher and 60° C. or lower, from a viewpoint of suppressing deterioration of the infrared-absorbing fine particles while promoting hydrolysis of the hydrolysis product or polymer. Further, the heating time is preferably 4 hours or more and 24 hours or less. According to such heating temperature and heating time, it is possible to further reduce a residual amount of the hydrolysis product or polymer in the coating film, and to further increase the ratio of the metal oxide hydrate, and possible to suppress deterioration of the infrared absorption properties due to alteration of the infrared-absorbing fine particles.

Further, the heat treatment is preferably performed while stirring and mixing the dispersion liquid. Thereby, the heat treatment can be uniformly applied to the coating film of individual fine particles, and the uniformity of the film quality of the coating film can be ensured.

Specific methods of the heat treatment include, for example, a method using a table with a built-in resistance heater such as a hot plate, a container or kiln wrapped with a resistance heater such as a rubber heater, a constant temperature bath such as a water bath or an oil bath, or a container and kiln wrapped with a heating medium pipe such as hot water and heating oil.

<2-5> Drying Treatment

Next, the dispersion liquid containing the surface-treated infrared-absorbing fine particles obtained by the heat treatment is dried. Specifically, the above dispersion liquid is dried by heating or drying under a condition capable of avoiding strong aggregation of the surface-treated infrared-absorbing fine particles, or by vacuum fluidized drying, spray drying, etc., at a temperature of less than 100° C. Thereby, fine particle powder containing surface-treated infrared-absorbing fine particles is obtained.

In the treatment by vacuum fluidized drying, since drying and pulverization are simultaneously performed in a reduced pressure atmosphere, a drying speed is high and aggregation of the surface-treated infrared-absorbing fine particles can be avoided. Further, since the drying is performed under a reduced pressure atmosphere, a volatile component can be removed even at a relatively low temperature, and an amount of remaining volatile component can be reduced as much as possible. Further, in the treatment by spray drying, secondary aggregation due to a surface force of the volatile component is less likely to occur, and it is possible to obtain surface-treated infrared-absorbing fine particles that are relatively free from secondary aggregation even without the pulverization treatment.

A drying temperature is not particularly limited as long as the water contained in the dispersion liquid can be removed, but is preferably 40° C. or higher and 80° C. or lower, more preferably 50° C. or higher and 70° C. or lower, and even more preferably 50° C. or higher and 60° C. or lower. By performing the drying treatment at such a temperature, it is possible to promote the hydrolysis of the hydrolysis product remaining in the coating film (such as a product that has not been fully hydrolyzed to hydrate) even during the drying treatment, and therefore the heat treatment time can be reduced, and the production efficiency of the surface-treated infrared-absorbing fine particles can be further improved.

In the present embodiment, explanation is given for the case where the heating treatment and the drying treatment are performed separately, but the present invention is not limited thereto, and for example, the drying treatment may be performed simultaneously with the heat treatment. In this case, the heat treatment corresponds to the stage of raising a temperature or maintaining a constant temperature in the drying treatment. When the heat treatment and the drying treatment are performed separately, the hydrolysis product can be hydrolyzed more stably, and meanwhile when the heat treatment and the drying treatment are performed simultaneously, a production process can be simplified and a production efficiency can be improved.

<3> Applications of the Surface-Treated Infrared-Absorbing Fine Particles

The surface-treated infrared-absorbing fine particles of the present embodiment can be used in a state of fine particles, or in a state of being dispersed in a liquid medium or a solid medium. The applications of the surface-treated infrared-absorbing fine particles will be described, with the infrared-absorbing fine particle dispersion liquid, infrared-absorbing fine particle dispersion body, infrared-absorbing substrate, and an article using the infrared-absorbing fine particle dispersion body or the infrared-absorbing substrate, as specific examples.

<3-1> Infrared-Absorbing Fine Particle Dispersion Liquid

The infrared-absorbing fine particle dispersion liquid contains fine particle powder containing the surface-treated infrared-absorbing fine particles described above and a liquid medium, with the fine particle powder dispersed in the liquid medium.

The infrared-absorbing fine particle dispersion liquid can be prepared, for example, by adding the fine particle powder to the liquid medium and redispersing it. Further for example, the infrared-absorbing fine particle dispersion liquid can be prepared by replacing the liquid medium and replacing the liquid medium, for example, in such a manner that the surface-treated infrared-absorbing fine particles are separated from the dispersion liquid containing the surface-treated infrared-absorbing fine particles and added to the liquid medium.

(Dispersed Particle Size)

The dispersed particle size of the surface-treated infrared-absorbing fine particles when the fine-particle powder is dispersed in a liquid medium can be appropriately changed according to the application of the infrared-absorbing fine particle dispersion liquid. For example, for applications that require transparency, the dispersed particle size is preferably 800 nm or less. By setting the dispersed particle size to 800 nm or less, light is not completely shielded by scattering, and visibility in the visible light region can be maintained, and at the same time, transparency can be efficiently maintained.

Further, particularly, when the transparency in the visible light region is emphasized, it is preferable to consider scattering due to fine particles. The dispersed particle size is preferably 200 nm or less, more preferably 100 nm or less, from a viewpoint of reducing scattering due to fine particles. This is because when the dispersed particle size of the particles is small, the scattering of light with a wavelength of 400 nm to 780 nm in the visible light region due to geometric scattering or Mie scattering is reduced, and as a result, it can be avoided that the infrared absorption film becomes like frosted glass and clear transparency cannot be obtained. That is, when the dispersed particle size is 200 nm or less, the geometric scattering or Mie scattering is reduced, resulting in a Rayleigh scattering region. This is because, in the Rayleigh scattering region, the scattered light is reduced in proportion to the sixth power of the particle size, and therefore as the dispersed particle size is decreased, the scattering is reduced and the transparency is improved.

Further when the dispersed particle size is 100 nm or less, the scattered light is extremely small, which is preferable. The smaller the dispersed particle size is, the better, from a viewpoint of avoiding light scattering. When the dispersed particle size is 1 nm or more, industrial production is easy.

By setting the dispersed particle size to 800 nm or less, a haze value of the infrared-absorbing fine particle dispersion body in which the infrared-absorbing fine particles are dispersed in a liquid medium, can be 85% or less in visible light transmittance and 30% or less in haze. When the haze is greater than 30%, the infrared absorption film will look like frosted glass and clear transparency cannot be obtained.

The dispersed particle size can be measured using an ELS-8000 manufactured by Otsuka Electronics Co., Ltd. based on a dynamic light scattering method.

(Liquid Medium)

One or more liquid mediums selected from organic solvents, fats and oils, liquid plasticizers, compounds polymerized by curing, and water can be used as the liquid medium.

Alcohol-based, ketone-based, hydrocarbon-based, glycol-based, water-based, ETC., can be used as the organic solvent.

Specifically, alcohol solvents such as methanol, ethanol, 1-propanol, isopropanol, butanol, pentanol, benzyl alcohol, and diacetone alcohol;

ketone solvents such as acetone, methyl ethyl ketone, dimethyl ketone, methyl propyl ketone, methyl isobutyl ketone, cyclohexanone, and isophorone;

ester solvents such as 3-methyl-methoxy-propionate, n-butyl acetate;

glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate;

amides such as formamide, N-methylformamide, dimethylformamide, dimethylacetamide, N-methyl-2-pyrrolidone;

aromatic hydrocarbons such as toluene and xylene;

ethylene chloride, chlorobenzene, etc., can be used.

Then, among these organic solvents, particularly, dimethyl ketone, methyl ethyl ketone, methyl isobutyl ketone, toluene, propylene glycol monomethyl ether acetate, n-butyl acetate, etc., can be preferably used.

As fats and oils, vegetable fats and oils or plant-derived fats and oils are preferable. Vegetable oils include dry oils such as linseed oil, sunflower oil, tung oil, and perilla oil; semi-dry oils such as sesame oil, cottonseed oil, rapeseed oil, soybean oil, rice bran oil, and poppy oil; and non-drying oils such as olive oil, coconut oil, palm oil, dehydrated castor oil, etc., can be used.

As a vegetable oil-derived compound, a fatty acid monoester obtained by directly esterifying a fatty acid of vegetable oil and monoalcohol, ethers, etc., can be used.

Further, a commercially available petroleum-based solvent can also be used as a fat and oil.

As a commercially available petroleum solvent, Isopar (registered trademark) E, Exol (registered trademark) Hexane, Heptane, E, D30, D40, D60, D80, D95, D110, D130 (manufactured by ExxonMobil), etc. can be used.

As a liquid plasticizer, for example, a plasticizer that is a compound of a monohydric alcohol and an organic acid ester, an ester plasticizer such as a polyhydric alcohol organic acid ester compound, a phosphoric acid plasticizer such as an organic phosphoric acid plasticizer, etc., can be used. All of them are preferably liquid at room temperature.

Among them, a plasticizer which is an ester compound synthesized from a polyhydric alcohol and a fatty acid can be preferably used. The ester compound synthesized from the polyhydric alcohol and fatty acid is not particularly limited, but for example, a glycol-based ester compound, etc., can be used, which is obtained by a reaction between glycols such as triethylene glycol, tetraethylene glycol, and tripropylene glycol, and monobasic organic acids such as butyric acid, isobutyric acid, caproic acid, 2-ethylbutyric acid, heptylic acid, n-octylic acid, 2-ethyihexylic acid, pelargonic acid (n-nonylic acid), and decylic acid.

Further, ester compounds of tetraethylene glycol, tripropylene glycol and the above-described monobasic organic compounds, can also be used.

Among them, fatty acid esters of triethylene glycol such as triethylene glycol dihexanate, triethylene glycol di-2-ethylbutyrate, triethylene glycol di-octanate, triethylene glycol di-2-ethylhexanoate, etc., can be used. Further, fatty acid esters of triethylene glycol can also be preferably used.

Compounds that are polymerized by curing are monomers and oligomers that form polymers by polymerization, etc. Specifically, methyl methacrylate monomers, acrylate monomers, styrenic resin monomers, etc., can be used.

As described above, two or more of the liquid media described above can be used in combination. Further, acid or alkali may be added to these liquid media to adjust pH if necessary.

(Other Additives)

In addition to the above additives, a dispersant, a surfactant, a coupling agent, etc., may be added to the infrared-absorbing fine particle dispersion liquid, if necessary. These additives can further improve a dispersion stability of the surface-treated infrared-absorbing fine particles and prevent the dispersed particles from becoming coarse due to reaggregation.

Dispersants, coupling agents, and surfactants can be selected according to the application, but those having an amine-containing group, a hydroxyl group, a carboxyl group, a sulfo group, or an epoxy group as a functional group, can be preferably selected. These functional groups have an effect of adsorbing on the surfaces of the surface-treated infrared-absorbing fine particles to prevent aggregation and to uniformly disperse them. Polymeric dispersants having any of these functional groups in a molecule are more preferable.

Further, acrylic-styrene copolymer dispersants having functional groups are also preferable dispersants. Among them, acrylic-styrene copolymer dispersants having a carboxyl group as a functional group and acrylic dispersants having an amine-containing group as a functional group are more preferable examples. The dispersant having an amine-containing functional group preferably has a molecular weight Mw of 2,000 to 200,000 and an amine value of 5 to 100 mgKOH/g. Further, the dispersant having a carboxyl group preferably has a molecular weight Mw of 2,000 to 200,000 and an acid value of 1 to 50 mgKOH/g.

Preferable specific examples of commercially available dispersants include: SOLSPERSE (registered trademark) manufactured by Nippon Lubrizol (same below) 3000, 5000, 9000, 11200, 12000, 13000, 13240, 13650, 13940, 16000, 17000, 18000, 20000, 21000, 24000SC, 24000GR, 26000, 27000, 28000, 31845, 32000, 32500, 32550, 32600, 33000, 33500, 34750, 35100, 35200, 36600, 37500, 38500, 39000, 41000, 41090, 53095, 55000, 56000, 71000, 76500, J180, J200, M387, etc.; SOLPLUS (registered trademark) (same below) D510, D520, D530, D540, DP310, K500, L300, L400, R700, etc.; Disperbyk (registered trademark) manufactured by BYK-Chemie Japan (same below)—101, 102, 103, 106, 107, 108, 109, 110, 111, 112, 116, 130, 140, 142, 145, 154, 161, 162, 163, 164, 165, 166, 167, 168, 170, 171, 174, 180, 181, 182, 183, 184, 185, 190, 191, 192, 2000, 2001, 2009, 2020, 2025, 2050, 2070, 2095, 2096, 2150, 2151, 2152, 2155, 2163, 2164, Anti-Terra (registered trademark) (same below)—U, 203, 204, etc.; BYK (registered trademark) (same below)—P104, P104S, P105, P9050, P9051, P9060, P9065, P9080, 051, 052, 053, 054, 055, 057, 063, 065, 066N, 067A, 077, 088, 141, 220S, 300, 302, 306, 307, 310, 315, 320, 322, 323, 325, 330, 331, 333, 337, 340, 345, 346, 347, 348, 350, 354, 355, 358N, 361N, 370, 375, 377, 378, 380N, 381, 392, 410, 425, 430, 1752, 4510, 6919, 9076, 9077, W909, W935, W940, W961, W966, W969, W972, W980, W985, W995, W996, W9010, Dynwet800, Siclean3700, UV3500, UV3510, UV3570, etc.; EFKA (registered trademark) manufactured by Efka Additives (same below) 2020, 2025, 3030, 3031, 3236, 4008, 4009, 4010, 4015, 4020, 4046, 4047, 4050, 4055, 4060, 4080, 4300, 4310, 4320, 4330, 4340, 4400, 4401, 4402, 4403, 4500, 5066, 5220, 6220, 6225, 6230, 6700, 6780, 6782, 7462, 8503, etc.; JONCRYL (registered trademark) manufactured by BASF Japan (same below) 67, 678, 586, 611, 680, 682, 690, 819, -JDX5050, etc.; TERPLUS (registered trademark) manufactured by Otsuka Chemical Co., Ltd. (same below) MD1000, D 1180, D 1130, etc.; Ajisper (registered trademark) manufactured by Ajinomoto Fine-Techno Co., Ltd. (same below) PB-711, PB-821, PB-822, etc.; DISPARON (registered trademark) manufactured by Kusumoto Chemicals, Ltd. (same as below) 1751N, 1831, 1850, 1860, 1934, DA-400N, DA-703-50, DA-375, DA-375, DA-550, DA-705, DA-725, DA-14301, DN-900, NS-5210, NVI-8514L, etc. Alfon (registered trademark) manufactured by Toagosei Co., Ltd. (same below) UH-2170, UC-3000, UC-3910, UC-3920, UF-5022, UG-4010, UG-4035, UG-4040, UG-4070, *Reseda* (registered trademark) (same below) GS-1015, GP-301, GP-301S, etc.; Dianal (registered trademark) manufactured by Mitsubishi Chemical Corporation (same below) BR-50, BR-52, BR-60, BR-73, BR-77, BR80, BR-83, BR-85, BR-87, BR-88, BR-90, BR-96, BR-102, BR-113, BR-116, etc.

(Method of Using the Infrared-Absorbing Fine Particle Dispersion Liquid)

The infrared-absorbing fine particle dispersion liquid can be applied to a surface of an appropriate substrate to form a dispersion film thereon and used as an infrared-absorbing substrate. That is, the dispersion film is a kind of dried and solidified infrared-absorbing fine particle dispersion liquid.

Further, the infrared-absorbing fine particle dispersion liquid can be dried and pulverized to obtain a powdery infrared-absorbing fine particle dispersion body (hereinafter also referred to as a dispersion powder). That is, the dispersed powder is a kind of dried and solidified infrared-absorbing fine particle dispersion liquid. The dispersed powder is a powdery dispersion body in which surface-treated infrared-absorbing fine particles are dispersed in a solid medium (such as a dispersant), and is distinguished from the surface-treated infrared-absorbing fine particles described above. Since the dispersed powder contains a dispersant, it is possible to easily re-disperse the surface-treated infrared-absorbing fine particles in the medium by mixing it with an appropriate medium.

The dispersed powder can be used as a raw material for adding surface-treated infrared-absorbing fine particles in a dispersed state to an infrared-absorbing product. That is, the dispersed powder in which the surface-treated infrared-absorbing fine particles are dispersed in a solid medium may be dispersed again in a liquid medium and used as a dispersion liquid for infrared-absorbing products, or can be used by kneading into a resin as described later.

On the other hand, the infrared-absorbing fine particle dispersion liquid is used in various applications utilizing light-to-heat conversion.

For example, a curable ink composition can be obtained, by adding the surface-treated infrared-absorbing fine particles to an uncured thermosetting resin, or by dispersing the surface-treated infrared-absorbing fine particles in an appropriate solvent and then adding the uncured thermosetting resin. The curable ink composition is provided on a predetermined substrate and exhibits excellent deposition on the substrate when cured by irradiation with electromagnetic waves such as infrared rays. At this time, the surface-treated infrared-absorbing fine particles act as an aid for increasing an amount of heat generated by infrared irradiation. Then, the curable ink composition is suitable not only for conventional ink applications, but also for stereolithography, in which a predetermined amount is applied, irradiated with electromagnetic waves such as infrared rays, cured and stacked to form a three-dimensional object.

Further for example, a thermoplastic resin-containing ink composition can be obtained by adding the surface-treated infrared-absorbing fine particles to the thermoplastic resin that has been melted by heating, or by dispersing the surface-treated infrared-absorbing fine particles in an appropriate solvent and then adding the thermoplastic resin that is highly soluble in the solvent. The thermoplastic resin-containing ink composition is provided on a predetermined substrate, and firmly deposits on the substrate during removal of the solvent by irradiation with electromagnetic waves such as infrared rays and during heat fusion of the resin. At this time, the surface-treated infrared-absorbing fine particles act as an aid for increasing an amount of heat generated by infrared irradiation. Thus, the thermoplastic resin-containing ink composition is suitable not only for conventional ink applications, but also for stereolithography, in which a predetermined amount is applied, irradiated with electromagnetic waves such as infrared rays, cured and stacked to form a three-dimensional object.

<3-2> Infrared-Absorbing Fine Particle Dispersion Body

The infrared-absorbing fine particle dispersion body contains surface-treated infrared-absorbing fine particles and a solid medium, and the surface-treated infrared-absorbing fine particles are dispersed in the solid medium.

As the solid medium, for example, a solid medium such as resin or glass can be used. The type of the resin is not particularly limited, and can be appropriately selected according to the application. For example, low-cost, highly transparent and versatile resins, PET resins, acrylic resins, polyamide resins, vinyl chloride resins, polycarbonate resins, olefin resins, epoxy resins, polyimide resins, etc., can be used. Further, a fluororesin can also be used in consideration of a weather resistance.

An amount of a filler relative to the solid medium (that is, an amount of a blend of the surface-treated infrared-absorbing fine particles) can be appropriately changed according to a thickness of the substrate and required optical and mechanical properties, but in general, it is preferably 50% by mass or less relative to the solid medium. When the amount is 50% by mass or less, granulation of the fine particles in the solid medium can be suppressed, and good transparency can be maintained. Further, since a use amount of the surface-treated infrared-absorbing fine particles can be controlled, it is advantageous in terms of a cost.

The shape of the infrared-absorbing fine particle dispersion body is not particularly limited, and can be appropriately changed depending on the application. For example, the shape can be changed to an arbitrary shape such as a film shape or a board shape. Further, the thickness of the film-shaped or board-shaped body may be appropriately changed according to the purpose of use, and may be, for example, 0.1 μm to 50 mm.

The infrared-absorbing fine particle dispersion body can be produced as follows.

For example, the infrared-absorbing fine particle dispersion body can be produced by adding the surface-treated infrared-absorbing fine particles, the infrared-absorbing fine particle dispersion liquid, or a powdery dispersion body in which the surface-treated infrared-absorbing fine particles are dispersed in the solid medium, to a liquid medium and kneading a mixture directly into a resin, and molding the kneaded mixture into an arbitrary shape.

Specifically, after the resin is melted by heating to a temperature near its melting point (approximately 200 to 300° C.), the surface-treated infrared-absorbing fine particles, etc., are mixed and kneaded. Subsequently, this mixture is formed into a predetermined shape by, for example, an extrusion method, an inflation method, a solution casting method, a casting method, etc.

The kneaded mixture may be molded as it is, or after being pelletized, pellets may be molded by the above method.

Further for example, the infrared-absorbing fine particle dispersion body obtained by dispersing the surface-treated infrared-absorbing fine particles in a solid medium can be further pulverized into a powder to produce a dispersion body. In the powdery infrared-absorbing fine particle dispersion body, the surface-treated infrared-absorbing fine particles are already sufficiently dispersed in a solid medium. Therefore, a liquid or solid infrared-absorbing fine particle dispersion body can be easily produced by dissolving the powdery infrared-absorbing fine particle dispersion body as a so-called masterbatch in an appropriate liquid medium or kneading it into a resin pellet, etc.

<3-3> Infrared-Absorbing Substrate

The infrared-absorbing substrate is obtained by forming a film-like dispersion body (dispersion film) containing surface-treated infrared-absorbing fine particles, on the surface of the substrate. According to the infrared-absorbing substrate, by providing the dispersion film on the surface, it has excellent moist-heat resistance and chemical stability, and can be suitably used as an infrared-absorbing material.

The material of the substrate is not particularly limited as long as it is transparent, but glass, a resin board, a resin sheet, and a resin film are preferably used.

The resins used for resin boards, resin sheets, and resin films are not particularly limited as long as they do not affect required surface condition and durability of the boards, sheets, and films. Examples include boards, sheets, and films including transparent polymers, for example, polyester polymers such as polyethylene terephthalate and polyethylene naphthalate; cellulosic polymers such as diacetyl cellulose and triacetyl cellulose; polycarbonate polymers; acrylic polymers such as polymethyl methacrylate; styrenic polymers such as polystyrene and acrylonitrile-styrene copolymer; olefinic polymers such as polyethylene, polypropylene, polyolefin having cyclic or norbornene structure, and ethylene-propylene copolymers; vinyl chloride polymers; amide polymers such as aromatic polyamide; imide polymers; sulfone polymers, polyether sulfone polymers, polyether ether ketone polymers, polyphenylene sulfide polymers, vinyl alcohol polymers, vinylidene chloride polymers, vinyl butyral polymers, arylate polymers, polyoxymethylene polymers, epoxy polymers, and also various binary and ternary copolymers, graft copolymers, and blends thereof. In particular, biaxially oriented films including polyester such as polyethylene terephthalate, polybutylene terephthalate, or polyethylene-2,6-naphthalate are preferred in terms of mechanical properties, optical properties, heat resistance, and economic efficiency. The biaxially oriented polyester films may be polyester copolymer films.

The infrared-absorbing substrate can be produced as follows. For example, the infrared-absorbing fine particle dispersion liquid which is a liquid of a mixture of the surface-treated infrared-absorbing fine particles, an organic solvent such as alcohol, a liquid medium such as water, a resin binder, and optionally a dispersant, is applied on the surface of an appropriate substrate, then, the liquid medium is removed or cured, to obtain an infrared-absorbing substrate in which the infrared absorbing fine particle dispersion body is directly laminated on the surface of the substrate.

A resin binder component can be selected according to an application, and examples thereof include ultraviolet curable resin, thermosetting resin, normal temperature curable resin, thermoplastic resin, etc. On the other hand, the infrared-absorbing fine particle dispersion body may be laminated on the surface of the substrate by applying the infrared-absorbing fine particle dispersion liquid not containing a resin binder component, or after lamination, a liquid medium containing a binder component may be applied on a layer of the infrared-absorbing fine particle dispersion body.

Specifically, an example of the infrared-absorbing substrate includes the one obtained by applying the liquid infrared-absorbing fine particle dispersion body in which the surface-treated infrared-absorbing fine particles are dispersed in one or more liquid media selected from an organic solvent, an organic solvent in which resin is dissolved, an organic solvent in which resin is dispersed, and water, and solidifying the obtained coating film by an appropriate method. Further, an example of the infrared-absorbing substrate includes the one obtained by applying a liquid infrared-absorbing fine particle dispersion body containing a resin binder component on the surface of the substrate and solidifying the obtained coating film by an appropriate method. Further, an example of the infrared-absorbing substrate includes the one obtained by applying a liquid infrared-absorbing fine particle dispersion body on the surface of the substrate, the liquid infrared-absorbing fine particle dispersion body being obtained by mixing a predetermined medium and an infrared-absorbing fine particle dispersion body in which surface-treated infrared-absorbing fine particles are dispersed in a powdery solid medium, and solidifying the obtained coating film by an appropriate method. Of course, an example of the infrared-absorbing substrate includes the one obtained by applying an infrared-absorbing fine particle dispersion liquid in which two or more of various absorbing fine particle dispersion liquids are mixed, on the surface of the substrate, and solidifying the obtained coating film by an appropriate method.

<3-4> Articles

The above-described infrared-absorbing fine particle dispersion body and an infrared-absorbing article such as a film and board that are infrared-absorbing substrates, are used for a window material for various buildings and vehicles that is designed to shield infrared light while allowing sufficient visible light to maintain brightness while suppressing temperature rise in a room, and PDP (Plasma Display Panel), and can be suitably used as a filter, etc., for shielding infrared rays emitted forward from the PDP.

Further, since the surface-treated infrared-absorbing fine particles have absorption in the infrared region, infrared rays having a specific wavelength are absorbed when a printing surface containing surface-treated infrared-absorbing fine particles is irradiated with an infrared laser. Accordingly, the authenticity of the printed matter which is obtained by printing an anti-counterfeit ink containing the surface-treated infrared-absorbing fine particles on one or both sides of a substrate to be printed, can be determined from a difference in an amount of reflection or transmission by irradiation of the infrared rays having a specific wavelength and reading its reflection or transmission. The anti-counterfeit printed matter is an example of the infrared-absorbing fine particle dispersion body according to the present invention.

Further, a photothermal conversion layer can be formed by mixing an infrared-absorbing fine particle dispersion liquid and a binder component to produce an ink, applying this ink on a substrate, drying the applied ink, and then curing the dried ink. The photothermal conversion layer can generate heat only at a desired location with high positional accuracy by irradiation with an electromagnetic wave laser such as an infrared ray, and can be used in a wide range of fields such as electronics, medicine, agriculture, and machinery. For example, it can be suitably used as a donor sheet used when forming an organic electroluminescence element by a laser transfer method, thermal paper for a thermal printer, or an ink ribbon for a thermal transfer printer. The photothermal conversion layer is an example of the infrared-absorbing fine particle dispersion body according to the present invention.

Further, infrared-absorbing fiber is obtained by dispersing the surface-treated infrared-absorbing fine particles in an appropriate medium and making the dispersed matter contained on the surface and/or inside of the fiber. The infrared-absorbing fiber contains surface-treated infrared-absorbing fine particles to efficiently absorb near-infrared rays from sunlight, etc., and becomes an infrared-absorbing fiber with excellent heat retention, and at the same time, becomes an infrared-absorbing fiber with excellent design because it transmits light in the visible light region. As a result, it can be used for various applications such as cold weather clothing, sports clothing, stockings, textile products such as curtains, and other industrial textile products that require heat retention. The infrared-absorbing fiber is an example of the infrared-absorbing fine particle dispersion body according to the present invention.

Further, a film-like or board-like infrared-absorbing fine particle dispersion body can be applied to materials used for roofs, exterior walls, etc., of agricultural and horticultural greenhouses. Then, it can be used as a heat insulating material for agricultural and horticultural facilities having heat insulating properties by efficiently absorbing a light such as near-infrared light contained in the sunlight while ensuring the light necessary for photosynthesis of plants in greenhouses by transmitting visible light. The heat insulating material for agricultural and horticultural facilities is an example of the infrared-absorbing fine particle dispersion body according to the present invention.

<Effects of the Present Embodiment>

According to the present embodiment, one or more of the following effects can be obtained.

The surface-treated infrared-absorbing fine particles of the present embodiment are produced by depositing a hydrolysis product of a metal chelate compound or a polymer thereof on the surfaces of the infrared-absorbing fine particles, then, applying heat treatment to the deposited film. The heat treatment can further hydrolyze the hydrolysis product or polymer thereof contained in the deposited film to form a metal oxide hydrate. The coating film obtained by applying heat treatment to the deposited film contains the metal oxide hydrate and has a carbon concentration of 5.0% by mass or less. Such a coating film contains less hydrolysis products of metal chelate compounds or polymers thereof, and less carbon components derived from these. Therefore, in the surface-treated infrared-absorbing fine particles, high moist-heat resistance can be realized while maintaining high infrared absorption properties as compared with the case where the coating film comprises a hydrolysis product.

The metal oxide hydrate forming the coating film preferably contains one or more metal elements selected from Al, Zr, Ti, Si, and Zn. By containing such a metal element, the moist-heat resistance of the surface-treated infrared-absorbing fine particles can be further improved.

The heat treatment is preferably performed at a heating temperature of 40° C. or higher and 80° C. or lower for 4 hours or longer. By performing the heat treatment under such conditions, hydrolysis products, etc., in the deposited film can be further hydrolyzed. Therefore, in the coating film to be obtained, the carbon concentration can be reduced to increase the ratio of metal oxide hydrate, and the moist-heat resistance can be further improved.

Further, in the surface-treated infrared-absorbing fine particles of the present embodiment, the coating film has a low carbon concentration and is formed into a dense and high-density film by a predetermined heat treatment. Therefore, it is not required to apply heat treatment at 100° C. or higher, which is performed to improve deposition of the infrared-absorbing fine particles and chemical stability.

Generally, when heat treatment is performed at 100° C. or higher, the surface-treated infrared-absorbing fine particles tend to aggregate to form a coarse aggregate. The coarse aggregate impairs the transparency of the infrared-absorbing fine particle dispersion body, etc., so they must be pulverized and re-dispersed. However, when the surface-treated infrared-absorbing fine particles are pulverized, the coating film may be damaged, and in some cases, a part of the coating film may be peeled off. Therefore, it becomes difficult to achieve both transparency and moist-heat resistance. In this regard, the surface-treated infrared-absorbing fine particles of the present embodiment do not require heat treatment at 100° C. or higher. Therefore, aggregation due to high-temperature heat treatment and pulverization for redispersing the aggregation can be avoided. Accordingly, a decrease in the moist-heat resistance due to damage of the coating film, etc., can be suppressed, and high transparency can be achieved.

According to the surface-treated infrared-absorbing fine particles of the present embodiment or the infrared-absorbing fine particle dispersion liquid containing the same, an infrared-absorbing fine particle dispersion body or an infrared-absorbing substrate having excellent infrared absorption properties, moist-heat resistance, and transparency can be produced.

Specifically, when the infrared-absorbing fine particle dispersion body or the infrared-absorbing substrate is produced so that the visible light transmittance is 80%, the transmittance of light with a wavelength of 800 nm to 1000 nm is 32% or more and 55% or less, and high infrared absorption properties can be realized.

Further, when the infrared-absorbing fine particle dispersion body or the infrared-absorbing substrate produced so as to have the visible light transmittance of 80%, is exposed to a moist-heat atmosphere at a temperature of 85° C. and a relative humidity of 90% for 1000 hours, an amount of change in an average value of transmittance at wavelengths of 800 nm to 1000 nm before and after exposure is 1.5% or less, and excellent moist-heat resistance can be achieved.

Further, when the infrared-absorbing fine particle dispersion body or the infrared-absorbing substrate is produced so that the visible light transmittance is 80%, a haze value is 1.2% or less, and excellent transparency can be realized.

Example

The present invention will be specifically described below with reference to examples. However, the present invention is not limited to the following examples.

First, evaluation methods in examples and comparative examples will be described. In these examples, a dispersed particle size, crystallite size, BET specific surface area, and carbon concentration of the surface-treated infrared-absorbing fine particles were measured. An infrared-absorbing sheet as the infrared-absorbing substrate was evaluated for optical properties, haze value, and moist-heat resistance. Each evaluation method will be described below.

(Dispersed Particle Size)

A dispersed particle size is shown as an average value measured by a particle size measuring device (ELS-8000 manufactured by Otsuka Electronics Co., Ltd.) based on a dynamic light scattering method.

(Crystallite Size)

A crystallite size was measured by a powder X-ray diffraction method (θ-2θ method) using a powder X-ray diffractometer (X'Pert-PRO/MPD manufactured by PANalytical, Spectris Co., Ltd.), and calculated using a Rietveld method.

(BET Specific Surface Area)

A BET specific surface area was measured using a BET specific surface area measuring device (Macsorb-1208 manufactured by Mountec Co., Ltd.).

(Carbon Concentration)

A carbon concentration of the surface-treated infrared-absorbing fine particle powder was measured using a carbon analyzer (CS-600 manufactured by LECO) based on a combustion-infrared absorption method.

(Optical Properties)

Optical properties of the infrared-absorbing sheet were measured using a spectrophotometer (U-4100 manufactured by Hitachi, Ltd.) in a wavelength range of 200 nm to 2600 nm at intervals of 5 nm, and the visible light transmittance was calculated according to JISR3106. Further, an average value of transmittance at wavelengths of 800 nm to 1000 nm was also calculated. An optical property value (visible light transmittance, haze value) of the infrared-absorbing sheet referred to here is a value including the optical property value of a resin sheet that is the substrate.

(Haze Value)

A haze value of the infrared-absorbing sheet was measured using a haze meter (HM-150 manufactured by Murakami Color Co., Ltd.) and calculated according to JISK7105.

(Moist-Heat Resistance)

A method for evaluating the moist-heat resistance of the infrared-absorbing sheet is to expose the infrared-absorbing sheet having a visible light transmittance of about 80% in a moist-heat atmosphere at a temperature of 85° C. and a relative humidity of 90% for 1000 hours. Then, those with a change in solar transmittance of 1.5% or less before and after the exposure were judged to have a good moist-heat resistance, and those with a change in solar transmittance of more than 1.5% were judged to have insufficient moist-heat resistance.

Example 1 (Preparation of the Surface-Treated Infrared-Absorbing Fine Particle Powder A mixture obtained by mixing 25% by mass of Cs/W (molar ratio)=0.33 hexagonal cesium tungsten bronze ($Cs_{0.33}WO_z$, $2.0 \leq z \leq 3.0$) powder CWO (registered trademark) (YM-01 manufactured by Sumitomo Metal Mining Co., Ltd.) and 75% by mass of pure water, was loaded into a paint shaker containing 0.3 mmφ $ZrO_2$ beads, and subjected to pulverization and dispersion treatment for 10 hours to obtain a dispersion liquid of $Cs_{0.33}WO_z$ fine particles of example 1.

A dispersed particle size of the $Cs_{0.33}WO_z$ fine particles in the obtained dispersion liquid was measured and found to be 100 nm. The setting for the particle size measurement was as follows: a particle refractive index was 1.81 and a particle shape was non-spherical. Further, a background was measured using pure water, and a solvent refractive index was 1.33. After removing the solvent from the obtained dispersion liquid, the crystallite size was measured and found to be 32 nm. Further, after removing the solvent from the obtained dispersion liquid, a dried solid was pulverized in a mortar, and a BET specific surface area of the $Cs_{0.33}WO_z$ fine particles was measured and found to be 38 $m^2/g$.

The obtained $Cs_{0.33}WO_z$ fine particle dispersion liquid and pure water were mixed to obtain a coating film-forming dispersion liquid A having a $Cs_{0.33}WO_z$ fine particle concentration of 2% by mass.

The above is shown in Table 1 below.

TABLE 1

| | Preparation of coating film-forming dispersion liquid | | | | | | |
|---|---|---|---|---|---|---|---|
| | | Infrared-absorbing fine particles | | | | | |
| | Kind | Kind | Dispersed particle size [nm] | Crystallite size [nm] | BET specific surface area [$m^2/g$] | Added amount [mass %] | Dispersion medium |
| Ex. 1 | A | Hexagonal cesium tungsten bronze | 100 | 32 | 38 | 2 | Water |
| Ex. 2 | A | | 100 | 32 | 38 | 2 | |
| Ex. 3 | A | | 100 | 32 | 38 | 2 | |
| Ex. 4 | A | | 100 | 32 | 38 | 2 | |
| Ex. 5 | A | | 100 | 32 | 38 | 2 | |
| Ex. 6 | A | | 100 | 32 | 38 | 2 | |
| Ex. 7 | A | | 100 | 32 | 38 | 2 | |
| Ex. 8 | B | Hexagonal rubidium tungsten bronze | 100 | 32 | 35 | 2 | |
| Ex. 9 | C | $W_{18}O_{49}$ | 100 | 32 | 40 | 2 | |
| Com. Ex. 1 | D | Hexagonal cesium tungsten bronze | 100 | 32 | 38 | 7 | Toluene |
| Com. Ex. 2 | E | Hexagonal rubidium tungsten bronze | 100 | 32 | 35 | 7 | |

TABLE 1-continued

| | Preparation of coating film-forming dispersion liquid | | | | | | |
|---|---|---|---|---|---|---|---|
| | Infrared-absorbing fine particles | | | | | | |
| | Kind | Kind | Dispersed particle size [nm] | Crystallite size [nm] | BET specific surface area [$m^2$/g] | Added amount [mass %] | Dispersion medium |
| Com. Ex. 3 | F | $W_{18}O_{49}$ | 100 | 32 | 40 | 7 | |
| Com. Ex. 4 | A | Hexagonal cesium tungsten bronze | 100 | 32 | 38 | 2 | Water |

Subsequently, as shown in Table 2 below, a surface treatment agent a was obtained by mixing 2.5% by mass of aluminum ethyl acetoacetate diisopropylate as an aluminum-based chelate compound and 97.5% by mass of isopropyl alcohol (IPA).

TABLE 2

| | Surface treatment condition | | | | | | |
|---|---|---|---|---|---|---|---|
| | Surface treatment agent | | | IPA | | | Amount of metal element based on 100 parts by mass |
| | Kind | Kind | Added amount [mass %] | Added amount [mass %] | Drip amount [g] | Drip time [h] | of infrared-absorbing fine particles [parts by mass] |
| Ex. 1 | a | Aluminum ethyl | 2.5 | 97.5 | 360 | 3 | 5 |
| Ex. 2 | a | acetoacetate | 2.5 | 97.5 | 1800 | 15 | 25 |
| Ex. 3 | a | diisopropylate | 2.5 | 97.5 | 3600 | 30 | 50 |
| Ex. 4 | b | Zirconium tributoxyethyl-acetoacetate | 2.4 | 97.6 | 360 | 3 | 11 |
| Ex. 5 | c | Diisopropoxytitanium bisethylacetoacetate | 2.6 | 97.4 | 360 | 3 | 6 |
| Ex. 6 | d | Tetraethoxysilane | | | 309 | 3 | 234 |
| Ex. 7 | e | Zinc acetylacetonate | 4.4 | 95.6 | 360 | 3 | 22 |
| Ex. 8 | a | Aluminum ethyl | 2.5 | 97.5 | 360 | 3 | 5 |
| Ex. 9 | a | acetoacetate diisopropylate | 2.5 | 97.5 | 360 | 3 | 5 |
| Com. Ex. 1 | — | — | — | — | — | — | — |
| Com. Ex. 2 | — | — | — | — | — | — | — |
| Com. Ex. 3 | — | — | — | — | — | — | — |
| Com. Ex. 4 | a | Aluminum ethyl acetoacetate diisopropylate | 2.5 | 97.5 | 360 | 3 | 5 |

Subsequently, 890 g of the obtained coating film-forming dispersion liquid A was put in a beaker, and 360 g of the surface treatment agent a was added dropwise over 3 hours as shown in the above Table 2 while stirring strongly with a stirrer with feathers. Here, the surface treatment agent a was added as shown in Table 2, so that the content of an AL element derived from an AL-based chelated compound was 5 parts by mass based on 100 parts by mass of the infrared-absorbing fine particles. Thereby, a deposited film was formed by hydrolyzing the AL-based chelate compound contained in the surface treatment agent a, and depositing the hydrolysis product or polymer thereof on the surfaces of the infrared-absorbing fine particles. Subsequently, as shown in Table 3 below, the surface treatment agent a was added dropwise, then, the mixture was stirred for 5 hours at a temperature of 55° C., to prepare an aged solution of example 1. Thereby, the hydrolysis product or polymer thereof in the deposited film were further hydrolyzed to form a metal oxide hydrate, and a coating film containing the metal oxide hydrate was formed. Subsequently, by vacuum fluidized drying at a temperature of 55° C. for 3 hours, and evaporating a medium from the aging liquid, a powder containing surface-treated infrared-absorbing fine particles (surface-treated infrared-absorbing fine particles) of example 1 was obtained.

TABLE 3

| | Heat treatment conditions after adding surface treatment agent | | | |
|---|---|---|---|---|
| | Stirring | | Vacuum fluidized drying | |
| | Temperature [° C.] | Time [h] | Temperature [° C.] | Time [h] |
| Ex. 1 | 55 | 5 | 55 | 3 |
| Ex. 2 | 55 | 5 | 55 | 3 |
| Ex. 3 | 55 | 5 | 55 | 3 |
| Ex. 4 | 55 | 5 | 55 | 3 |
| Ex. 5 | 55 | 5 | 55 | 3 |
| Ex. 6 | 55 | 5 | 55 | 3 |
| Ex. 7 | 55 | 5 | 55 | 3 |

TABLE 3-continued

| | Heat treatment conditions after adding surface treatment agent | | | |
|---|---|---|---|---|
| | Stirring | | Vacuum fluidized drying | |
| | Temperature [° C.] | Time [h] | Temperature [° C.] | Time [h] |
| Ex. 8 | 55 | 5 | 55 | 3 |
| Ex. 9 | 55 | 5 | 55 | 3 |
| Com. Ex. 1 | — | — | — | — |
| Com. Ex. 2 | — | — | — | — |
| Com. Ex. 3 | — | — | — | — |
| Com. Ex. 4 | 20 | 24 | 30 | 72 |

(Carbon Concentration in the Surface-Treated Infrared-Absorbing Fine Particle Powder)

When the carbon concentration in the surface-treated infrared-absorbing fine particle powder of example 1 was measured, it was found to be 1.9% by mass as shown in Table 4 below.

TABLE 4

| | | Type | Molecular weight | Phenol number | Surrounding of hydroxyl group | Melting point |
|---|---|---|---|---|---|---|
| Resistance-imparting agent (D) | (d1) | 2-(2H-Benzotriazol-2-yl)-4-(1,1,3,3-tetramethylbutyl)phenol | 323 | 1 | — | 102° C. |
| | (d2) | 2-Hydroxy-4-n-octyloxy-benzophenone | 326 | 1 | — | 45° C. |
| | (d3) | 2,4-Dihydroxybenzophenone | 214 | 2 | — | 142° C. |
| | (d4) | 2,2'-Dihydroxy-4,4' dimeth-oxybenzophenone | 274 | 2 | — | 135° C. |
| | (d5) | 2,4-Bis(octylthiomethyl)-6-methylphenol | 425 | 1 | — | 14° C. |
| | (d6) | Nonylphenol | 220 | 1 | — | bp 293° C. |
| | (d7) | Dinonylphenol | 346 | 1 | — | −20° C. |
| Comparative component (D') | (d'1) | 2-(4,6-Dimethyl-1,3,5-triazin-2-yl)-5-[2-(2-ethyl-hexanoyloxy)ethoxy]phenol | 512 | 1 | — | 106° C. |
| | (d'2) | 2-[4,6-Di(2,4-xylyl)-1,3,5-triazin-2-yl]-5-octyloxyphenol | 509 | 1 | — | 90° C. |
| | (d'3) | Glycerin monostearate | 358 | — | — | 63° C. |
| | (d'4) | Dibenzyl ether | 198 | — | — | 4° C. |
| | (d'5) | Octyl-3,5-di-tert-butyl-4-hydroxy-hydrocinnamic acid | 390 | | Hindered | 10° C. |
| | (d'6) | Benzyl alcohol | 108 | — | — | −15° C. |
| | (d'7) | 1,3,5-Tris(3,5-di-tert-butyl-4-hydroxybenzyl)-1,3,5-triazin-2,4,6(1H,3H.5H)-trione | 784 | 3 | Hindered | 220° C. |
| | (d'8) | 4,4',4''-(1-Methylpropanyl-3-ylidene)tris(6-tert-butyl-m-cresol) | 545 | 3 | One-hindered | 185° C. |
| | (d'9) | Acetophenone | 120 | — | — | bp 202° C. |
| | (d'10) | Decanophenone | 232 | — | — | 35° C. |

(Preparation of the Infrared-Absorbing Fine Particle Dispersion Liquid)

8% by mass of the surface-treated infrared-absorbing fine particle powder of example 1, 24% by mass of a polyacrylate-based dispersant, and 68% by mass of toluene were mixed. The obtained mixture was loaded into a paint shaker containing 0.3 mmφ $ZrO_2$ beads, and subjected to pulverization and dispersion treatment for 1 hour to obtain an infrared-absorbing fine particle dispersion liquid of example 1.

(Preparation and Evaluation of the Infrared-Absorbing Sheet)

Subsequently, the infrared-absorbing fine particle dispersion powder of example 1 was obtained by evaporating the medium from the above infrared-absorbing fine particle dispersion liquid by vacuum fluidized drying. The dispersed powder and the polycarbonate resin were dry-blended so that a visible light transmittance of the infrared-absorbing sheet obtained later was about 80%. Here, they were blended so that the concentration of the surface-treated infrared-absorbing fine particles was 0.09 wt %. The obtained blend was kneaded at 290° C. using a twin-screw extruder, extruded through a T-die, and formed into a sheet material having a thickness of 0.75 mm by a calendar roll method, to obtain an infrared-absorbing sheet of example 1. The infrared-absorbing sheet is an example of the infrared-absorbing fine particle dispersion body according to the present invention.

When the optical properties of the obtained infrared-absorbing sheet of example 1 were measured, as shown in Table 5 below, it was found that the visible light transmittance was 79.7%, the average transmittance at wavelengths of 800 nm to 1000 nm was 32.5%, and the haze was 0.9%.

The obtained infrared-absorbing sheet of example 1 was exposed in a moist-heat atmosphere at a temperature of 85° C. and a relative humidity of 90% for 1000 hours, and the optical properties were measured. Then, as shown in Table 5 below, it was found that the visible light transmittance was 80.4%, the average transmittance at wavelengths of 800 nm to 1000 nm was 33.7%, and the haze was 0.9%. It was also found that an amount of change in the visible light transmittance due to exposure to the moist-heat atmosphere was 0.7%, and the amount of change in the average value of transmittance at wavelengths of 800 nm to 1000 nm was 1.2%, both of which were small, and the haze did not change.

TABLE 5

| | Infrared absorption sheet | | | | | | | | |
|---|---|---|---|---|---|---|---|---|---|
| | Initial | | | After 1000 hours of exposure to a moist-heat atmosphere | | | Amount of change before and after exposure | | |
| | Visible light transmittance [%] | At wavelengths of 800 to 1000 nm Average Transmittance [%] | Haze [%] | Visible light transmittance [%] | At wavelengths of 800 to 1000 nm Average Transmittance [%] | Haze [%] | Visible light transmittance [%] | At wavelengths of 800 to 1000 nm Average Transmittance [%] | Haze [%] |
| Ex. 1 | 79.7 | 32.5 | 0.9 | 80.4 | 33.7 | 0.9 | 0.7 | 1.2 | 0.0 |
| Ex. 2 | 79.8 | 32.5 | 0.9 | 80.5 | 33.8 | 0.9 | 0.7 | 1.3 | 0.0 |
| Ex. 3 | 80.3 | 32.9 | 0.8 | 81.0 | 34.1 | 0.9 | 0.7 | 1.2 | 0.1 |
| Ex. 4 | 80.2 | 32.8 | 1.0 | 80.9 | 34.0 | 1.0 | 0.7 | 1.2 | 0.0 |
| Ex. 5 | 80.4 | 32.8 | 1.0 | 81.0 | 34.0 | 1.0 | 0.6 | 1.2 | 0.0 |
| Ex. 6 | 79.6 | 32.5 | 1.0 | 80.3 | 33.7 | 1.0 | 0.7 | 1.2 | 0.0 |
| Ex. 7 | 79.9 | 32.8 | 1.0 | 80.6 | 34.1 | 1.0 | 0.7 | 1.3 | 0.0 |
| Ex. 8 | 79.4 | 42.5 | 1.1 | 80.3 | 44.0 | 1.1 | 0.9 | 1.5 | 0.0 |
| Ex. 9 | 79.5 | 54.3 | 0.9 | 80.4 | 55.8 | 0.9 | 0.9 | 1.5 | 0.0 |
| Com. Ex. 1 | 79.2 | 32.6 | 1.0 | 81.2 | 40.3 | 1.2 | 2.0 | 7.7 | 0.2 |
| Com. Ex. 2 | 79.5 | 34.3 | 1.0 | 81.5 | 40.8 | 1.0 | 2.0 | 6.5 | 0.0 |
| Com. Ex. 3 | 79.7 | 53.2 | 1.1 | 83.6 | 61.0 | 1.1 | 3.9 | 7.8 | 0.0 |
| Com. Ex. 4 | 79.6 | 32.5 | 0.9 | 80.8 | 34.7 | 0.9 | 1.2 | 2.2 | 0.0 |

(Evaluation of the Surface-Treated Infrared-Absorbing Fine Particles)

Finally, the properties of the surface-treated infrared-absorbing fine particles contained in the infrared-absorbing sheet of example 1 were investigated. The infrared-absorbing sheet of example 1 was immersed in chloroform to dissolve all organic components. Then, chloroform and a cake of surface-treated infrared-absorbing fine particle aggregates were separated using a centrifugal separator (H-9R manufactured by Kokusan Co., Ltd.) at a rotation speed of 22000 rpm. Then, the cake was washed with toluene, acetone, and ethanol in this order, to take out only the surface-treated infrared-absorbing fine particles.

When the components contained in the surface-treated infrared-absorbing fine particles taken out were analyzed by an ICP emission spectrometer (manufactured by Shimadzu Corporation, model: ICPE9000), as shown in Table 4, it was found that 56% by mass of tungsten and 4.2% by mass of aluminum were contained. Since tungsten is an element originating from $Cs_{0.33}WO_z$ fine particles, it was found that 84% by mass of $Cs_{0.33}WO_z$ fine particles were contained in the surface-treated infrared-absorbing fine particles. Here, Z of $Cs_{0.33}WO_z$ was calculated as 3.0. Further, when analyzing by a thermal analysis device in which a mass spectrometer (Q-MS, manufactured by Bruker AXS Co., Ltd.) was connected to a thermobalance device (manufactured by Bruker AXS Co., Ltd.), it was found that 2.4% by mass of water was contained. When the content of water derived from hydrate was calculated, it was 1.5% by mass. That is, it was found that the coating film contains a high proportion of water derived from the metal oxide hydrate, and the coating film mainly comprises hydrate. Here, the analysis by the thermal analysis device was performed by raising the temperature from room temperature to 500° C. at a temperature elevation rate of 20° C./min, and flowing a carrier gas at a He flow rate of 150 cc/min. All the gas components with mass-to-charge ratios of m/z=17 and 18 were assumed to be water, and its generation amount was evaluated.

Specifically, the content of the water derived from hydrate was calculated as follows.

As a metal chelate compound, when aluminum ethyl acetoacetate diisopropylate is used, aluminum ethyl acetoacetate dihydroxide is not completely hydrolyzed and remains in the coating film as a hydrolysis product. When one aluminum ethyl acetoacetate dihydroxide was thermally analyzed, two water molecules (molecular weight 18) are generated therefrom, and therefore an amount of water obtained by subtracting this amount is an amount of water derived from hydrate. There are 6 carbon atoms (atomic weight 12) in aluminum ethyl acetoacetate dihydroxide, and therefore when the carbon concentration of the surface-treated infrared-absorbing fine particles is c [% by mass], the content $h_3$ of the water derived from hydrolysis product (aluminum ethylacetoacetate dihydroxide) is $c/(12\times6)\times18\times2$, which is $c\times0.5$. Therefore, when the content of the water in the coating film is $h_2$[% by mass], the content $h_1$[% by mass] of the water derived from hydrate is $h_2-c\times0.5$. Specifically, $h_2$ is 2.4% by mass and c is 1.9% by mass, and therefore in example 1, the content $h_3$ of the water derived from hydrolysis product is 0.95 ($=1.9\times0.5$) % by mass, and the content $h_1$[% by mass] of the water derived from hydrate is 1.5% by mass.

From the above results, it was identified that the surface-treated infrared-absorbing fine particles were $Cs_{0.33}WO_z$ fine particles coated with a coating film containing alumina hydrate ($Al_2O_3\cdot nH_2O$).

Examples 2 and 3

In examples 2 and 3, as shown in Table 2, the same operation as in example 1 was performed except that the amount of the surface treatment agent a and the dropwise addition time thereof were changed, as the surface treatment condition. Specifically, the amount of the surface treatment agent a to be dropped was changed from 300 g in example 1 to 1800 g in example 2 and 3600 g in example 3, respectively. Further, the dropwise addition time was changed from 3 hours in example 1 to 15 hours in example 2 and 30 hours in example 3, respectively. Other than these changes, the same operation as in example 1 was performed to obtain a surface-treated infrared-absorbing fine particle powder, an infrared-absorbing fine particle dispersion liquid, an infrared-absorbing fine particle dispersion powder, and an infrared-absorbing sheet, and the same evaluation as in example 1 was performed. The content of the water derived from hydrate was calculated by the same method as in example 1.

Examples 4 to 7

In examples 4 to 7, as shown in Table 2, the same operation as in example 1 was performed except that surface treatment agents b to e were used instead of the surface treatment agent a to obtain a surface-treated infrared-absorbing fine particle powder, an infrared-absorbing fine-particle dispersion liquid, an infrared-absorbing fine-particle dispersion powder, and an infrared-absorbing sheet, and evaluation was performed in the same manner as in example 1.

The surface treatment agent b was prepared by mixing 2.4% by mass of zirconium tributoxyacetylacetonate and 97.6% by mass of isopropyl alcohol.

The surface treatment agent c was prepared by mixing 2.6% by mass of diisopropoxytitanium bisethylacetoacetate and 97.4% by mass of isopropyl alcohol.

The surface treatment agent d was prepared so as to contain only 309 g of tetraethoxysilane without adding isopropyl alcohol.

The surface treatment agent e was prepared by mixing 4.4% by mass of zinc acetylacetonate and 95.6% by mass of isopropyl alcohol.

For examples 4 to 7, as in example 1, the identity of the surface-treated infrared-absorbing fine particles contained in the infrared-absorbing sheet was investigated.

As a result, as shown in Table 4, in example 4, it was identified that the $Cs_{0.33}WO_z$ fine particles were surface-treated infrared-absorbing fine particles in which a coating film containing zirconia hydrate was formed on the surface.

Further, in example 5, it was identified that the $Cs_{0.33}WO_z$ fine particles were surface-treated infrared-absorbing fine particles in which a coating film containing titania hydrate was formed on the surface.

Further, in example 6, it was identified that the $Cs_{0.33}WO_z$ fine particles were surface-treated infrared-absorbing fine particles in which a coating film containing silica hydrate was formed on the surface.

Further, in example 7, it was identified that the $Cs_{0.33}WO_z$ fine particles were surface-treated infrared-absorbing fine particles in which a coating film containing zinc oxide hydrate was formed on the surface.

In examples 4 to 7, the content of the water derived from hydrate was calculated by the following method.

In example 4, zirconium tributoxyacetylacetonate was used as a metal chelate compound, and therefore the component remaining incompletely hydrolyzed was zirconium trihydroxide acetylacetonate.

This hydrolysis product contains 5 carbon atoms and 3 water molecules are found to be generated by thermal analysis. This reveals that the content of the water derived from hydrolysis product is $c \times 0.9$, and the content of the water derived from hydrate is $h - c \times 0.9$, which is 1.3% by mass.

Further, in example 5, diisopropoxytitanium bisethylacetoacetate was used as a metal chelate compound, and therefore the component remaining incompletely hydrolyzed was dihydroxytitanium bisethylacetoacetate. This hydrolysis product contains 10 carbon atoms and 2 water molecules are found to be generated by thermal analysis. This reveals that the content of the water derived from hydrolysis product is $c \times 0.3$, and the content of the water derived from hydrate is $h - c \times 0.3$, which is 1.8% by mass.

Further, in example 6, tetraethoxysilane was used as a metal chelate compound, and therefore the component remaining unhydrolyzed was tetraethoxysilane. It is found that tetraethoxysilane does not generate water molecules by thermal analysis, and therefore the content of the water derived from hydrate is h, which is 4.5% by mass.

Further, in example 7, zinc acetylacetonate was used as a metal chelate compound, and therefore the component remaining incompletely hydrolyzed was zinc monohydroxy monoacetylacetonate. This hydrolysis product contains 5 carbon atoms and 1 water molecule is found to be generated by thermal analysis. This reveals that the content of the water derived from hydrolysis product is $c \times 0.3$, and the content of the water derived from hydrate is $h - c \times 0.3$, which is 1.5% by mass.

Examples 8 and 9

In examples 8 and 9, the same operation as in example 1 was performed, except that the type of the infrared-absorbing fine particles was changed as shown in Table 1. Specifically, coating film-forming dispersion liquids B and C were prepared, with the infrared-absorbing fine particles changed as follows: the hexagonal cesium tungsten bronze powder of example 1 was changed to a hexagonal rubidium tungsten bronze powder with Rb/W (molar ratio)=0.33 in example 8, and to $W_{18}O_{49}$ of a Magneli phase in example 9 respectively. Then, the coating film-forming dispersion liquids B and C were subjected to the same operation as in example 1 to obtain a surface-treated infrared-absorbing fine particle powder, an infrared-absorbing fine-particle dispersion liquid, an infrared-absorbing fine-particle dispersion powder, and an infrared-absorbing sheet, and evaluation was performed in the same manner as in example 1. The content of the water derived from hydrate was calculated by the same method as in example 1.

Comparative Example 1

In comparative example 1, an infrared-absorbing fine particle dispersion liquid, an infrared-absorbing fine particle dispersion powder, and an infrared-absorbing sheet were prepared without subjecting the infrared-absorbing fine particles to the surface treatment as in examples 1 to 9. Specifically, as shown in Table 1, 7% by mass of hexagonal cesium tungsten bronze powder, 24% by mass of polyacrylate dispersant, and 69% by mass of toluene were mixed, the obtained mixed solution was loaded into a paint shaker containing 0.3 mmφ $ZrO_2$ beads and subjected to pulverization and dispersion treatment for 4 hours to obtain a coating film-forming dispersion liquid D of comparative example 1. When a dispersed particle size of the infrared-absorbing fine particles in the obtained coating film-forming dispersion liquid D was measured, it was found to be 100 nm. As a setting for measuring the particle size, a particle refractive index was 1.81 and a particle shape was non-spherical. Further, background was measured using toluene and a solvent refractive index was set to 1.50. Further, after removing the solvent from the obtained dispersion liquid, a crystallite size was measured and found to be 32 nm.

Subsequently, an infrared-absorbing fine particle dispersion liquid of comparative example 1 was prepared as it was without adding the surface treatment agent to the coating film-forming dispersion liquid D. The infrared-absorbing fine particle dispersion liquid of comparative example 1 was subjected to vacuum fluidized drying to evaporate the medium to obtain an infrared-absorbing fine particle dispersion powder of comparative example 1.

The infrared-absorbing fine particle dispersion powder of comparative example 1 and polycarbonate resin were dry-blended so that the concentration of the infrared-absorbing fine particles was 0.075 wt %. The obtained blend was kneaded at 290° C. using a twin-screw extruder, extruded through a T-die, and made into a sheet material having a thickness of 0.75 mm by a calendar roll method to obtain an infrared-absorbing sheet of comparative example 1.

When the optical properties of the obtained infrared-absorbing sheet of comparative example 1 were measured, as shown in Table 4, the visible light transmittance was 79.2%, the average transmittance at wavelengths of 800 nm to 1000 nm was 32.6%, and the haze was 1.0%.

The obtained infrared-absorbing sheet of comparative example 1 was exposed to a moist-heat atmosphere of 85° C. and 90% for 1000 hours, and then the optical properties were measured. Then, it was found that the visible light transmittance was 81.2%, the average transmittance at wavelengths of 800 nm to 1000 nm was 40.3%, and the haze was 1.2%. An amount of change in visible light transmittance due to exposure to the moist-heat atmosphere was 2.0%, and an amount of change in the average value of transmittance at wavelengths of 800 nm to 1000 nm was 7.7%, which were found to be large compared to the examples. Also, the rate of change in the haze was 0.2%.

Since no coating film was formed in comparative example 1, ICP emission spectrometry was not performed to the components contained in the infrared-absorbing fine particles. Also, the carbon concentration was not measured.

Comparative Examples 2 and 3

In comparative examples 2 and 3, as shown in Table 1, the same operation was performed as in comparative example 1 except for the change in the type of infrared-absorbing fine particles. Specifically, the coating film-forming dispersion liquids E and F were prepared, with the type of the infrared-absorbing fine particles changed to hexagonal rubidium tungsten bronze powder with RB/W (molar ratio)=0.33 in comparative example 2, and to $W_{18}O_{49}$ of a magneli phase in comparative example 3, respectively. Subsequently, using this coating film-forming dispersion liquids E and F, an infrared-absorbing fine particle dispersion powder and an infrared absorption sheet were obtained, and the same evaluation was performed as in example 1. Since the coating film was not formed in comparative examples 1 and 3, the ICP light emission analysis was not performed to the contained components of infrared-absorbing fine particles.

Comparative Example 4

In comparative example 4, as shown in Table 3, the same operation as in example 1 was performed except that the heat treatment conditions after the addition of the surface treatment agent were changed. Specifically, 890 g of coating film-forming dispersion liquid A obtained in the same manner as in example 1 was placed in a beaker, and 360 g of surface treatment agent a was added dropwise over 3 hours, while vigorously stirring with a stirrer with blades. In comparative example 4, after dropwise addition of the surface treatment agent a, stirring was performed at a temperature of 20° C. for 24 hours to prepare an aging liquid. Subsequently, a powder containing surface-treated infrared-absorbing fine particles of comparative example 4 was obtained by evaporating the medium from the aging liquid by vacuum fluidized drying at a temperature of 30° C. for 72 hours. When the carbon concentration of the surface-treated infrared-absorbing fine particle powder of comparative example 4 was measured, as shown in Table 4, it was found to be 5.6% by mass. The same operation as in example 1 was performed using the obtained powder to obtain an infrared absorbing fine particle dispersion liquid, an infrared absorbing fine particle dispersion powder, and an infrared absorbing sheet of comparative example 4 and evaluation was performed in the same manner as in example 1.

For comparative example 4, as in example 1, the identity of the surface-treated infrared-absorbing fine particles contained in the infrared-absorbing sheet was investigated. As a result, as shown in Table 4, it was found that 55% by mass of tungsten and 4.1% by mass of aluminum were contained. Since tungsten is an element originating from $Cs_{0.33}WO_z$ fine particles, it was found that 83% by mass of $Cs_{0.33}WO_z$ fine particles were contained in the surface-treated infrared-absorbing fine particles. Here, Z of $Cs_{0.33}WO_z$ was calculated as 3.0. Further, it was found that 3.1% by mass of water was contained. When the content of water derived from hydrate was calculated in the same manner as in example 1, it was found to be 0.30% by mass. Further, as shown in Table 4, it was found that the carbon concentration exceeded 5.6% by mass and 5.0%. This reveals that in the coating film of comparative example 4, it was confirmed that the ratio of water derived from metal oxide hydrate is small, and more hydrolysis products that have not been fully hydrolyzed to hydrate remain in the coating film than the hydrate.

<Evaluation Results>

As shown in Tables 4 and 5, in examples 1 to 9, it was confirmed that meta oxide hydrates were contained, and by forming the coating film having a low carbon concentration of 5.0% by mass or less, the change in transmittance of light with wavelengths of 800 nm to 1000 nm before and after exposure was 1.5% or less, and high moist-heat resistance could be realized. It was also confirmed that an initial value of the transmittance of light with wavelengths of 800 nm to 1000 nm before exposure is 32% or more and 55% or less, and high infrared absorption properties could be realized. It was also confirmed that the haze value was as small as 1.2% or less, and it had excellent transparency.

In contrast, in comparative examples 1 to 3, as shown in Table 5, regarding the transmittance of light with a wavelength of 800 nm to 1000 nm, although the initial value before exposure was low, the value after exposure was high, and it was confirmed that the moist-heat resistance was low. This is presumably because the coating film was not provided on the surface of the infrared-absorbing fine particles, so the surfaces of the infrared-absorbing fine particles were decomposed by water, and the infrared absorption properties were lowered.

Further, in comparative example 4, as shown in Table 4, it was confirmed that the carbon concentration in the surface-treated infrared-absorbing fine particles was 5.6% by mass, exceeding 5.0% by mass. This is presumably because in comparative example 4, after forming the deposited film containing the hydrolysis product, heat treatment was performed, but the heat treatment was insufficient and the hydrolysis of the hydrolysis product did not progress so much, and the hydrolysis product remained in the coating film.

As described above, according to the present embodiment, it was confirmed that the coating film contains a predetermined amount of metal oxide hydrate and has a carbon concentration of a predetermined value or less in the surface-treated infrared-absorbing fine particles, and therefore the moist-heat resistance can be improved while maintaining a desired high infrared absorption properties.

The invention claimed is:

1. Surface-treated infrared-absorbing fine particles, comprising:

infrared-absorbing fine particles; and a coating film containing a metal oxide hydrate provided so as to coat surfaces of the infrared-absorbing fine particles, wherein a carbon concentration of the coating film is 5.0% by mass or less as measured by a combustion-infrared absorption method, and a content of water derived from the metal oxide hydrate is 1.0% by mass or more and 8.0% by mass or less of the coating film and wherein the infrared-absorbing fine particles are at least one of tungsten oxide fine particles represented by a general formula WyOz, where W is tungsten, O is oxygen, and satisfying $2.2 \leq z/y \leq 2.999$, or composite tungsten oxide fine particles represented by a general formula MxWyOz, where M is one or more elements selected from H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, and satisfying $0.001 \leq x/y \leq 1$ and $2.0 \leq z/y \leq 3.0$.

2. The surface-treated infrared-absorbing fine particles according to claim 1, wherein the metal oxide hydrate contains one or more metal elements selected from Al, Zr, Ti, Si, and Zn.

3. A method for producing surface-treated infrared-absorbing fine particles, the method including:

mixing infrared-absorbing fine particles and water to obtain a coating film-forming dispersion liquid;

adding a surface treatment agent containing a metal chelate compound to the coating film-forming dispersion liquid; and applying heat treatment to the coating film-forming dispersion liquid to which the surface treatment agent has been added, to obtain surface-treated infrared-absorbing fine particles in which a coating film containing a metal oxide hydrate derived from the metal chelate compound, is formed on surfaces of the infrared-absorbing fine particles, and wherein a carbon concentration of the coating film is 5.0% by mass or less as measured by a combustion-infrared absorption method, and a content of water derived from the metal oxide hydrate is 1.0% by mass or more and 8.0% by mass or less of the coating film wherein the infrared-absorbing fine particles are at least one of tungsten oxide fine particles represented by a general formula WyOz, where W is tungsten, O is oxygen, and satisfying $2.2 \leq z/y \leq 2.999$, or composite tungsten oxide fine particles represented by a general formula MxWyOz, where M is one or more elements selected from H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, and satisfying $0.001 \leq x/y \leq 1$ and $2.0 \leq z/y \leq 3.0$.

4. The method for producing surface-treated infrared-absorbing fine particles according to claim 3, wherein the heat treatment is performed at a temperature of 40° C. or higher and 80° C. or lower for 4 hours or longer.

5. An infrared-absorbing fine particle dispersion liquid, containing the surface-treated infrared-absorbing fine particles according to claim 1, and a liquid medium.

6. The infrared-absorbing fine particle dispersion liquid according to claim 5, wherein the liquid medium is at least one of an organic solvent, a fat and oil, a liquid plasticizer, a compound polymerized by curing, and water.

7. An infrared-absorbing fine particle dispersion body, comprising the surface-treated infrared-absorbing fine particles of claim 1 dispersed in a solid resin.

8. The infrared-absorbing fine particle dispersion body according to claim 7, wherein the solid resin is at least one of fluorine resin, PET resin, acrylic resin, polyamide resin, vinyl chloride resin, polycarbonate resin, olefin resin, epoxy resin and polyimide resin.

* * * * *